(12) United States Patent
Obana et al.

(10) Patent No.: US 7,853,083 B2
(45) Date of Patent: Dec. 14, 2010

(54) IMAGE PROCESSING APPARATUS AND METHOD, PROGRAM RECORDING MEDIUM, AND PROGRAM THEREFOR

(75) Inventors: Michimasa Obana, Tokyo (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 967 days.

(21) Appl. No.: 11/677,223

(22) Filed: Feb. 21, 2007

(65) Prior Publication Data

US 2007/0209003 A1 Sep. 6, 2007

(30) Foreign Application Priority Data

Mar. 1, 2006 (JP) .............................. 2006-054950

(51) Int. Cl.
G06K 9/46 (2006.01)
G06K 9/66 (2006.01)

(52) U.S. Cl. ....................... 382/190; 382/276; 382/309; 386/52; 715/723

(58) Field of Classification Search ................. 345/620; 382/190, 276; 386/52, 54, 64, 123
See application file for complete search history.

(56) References Cited

U.S. PATENT DOCUMENTS

| | | | |
|---|---|---|---|
| 5,543,925 A | | 8/1996 | Timmermans |
| 6,324,309 B1 * | | 11/2001 | Tokuyama et al. ........... 382/300 |
| 7,020,381 B1 * | | 3/2006 | Kato et al. ..................... 386/52 |
| 7,593,961 B2 * | | 9/2009 | Eguchi et al. ...................... 1/1 |
| 2001/0004417 A1 * | | 6/2001 | Narutoshi et al. ............. 386/52 |
| 2002/0122659 A1 * | | 9/2002 | McGrath et al. ............ 386/117 |
| 2002/0154140 A1 * | | 10/2002 | Tazaki ......................... 345/620 |
| 2002/0176690 A1 * | | 11/2002 | Nagasawa .................... 386/52 |
| 2004/0070685 A1 | | 4/2004 | Kondo et al. |
| 2005/0165844 A1 * | | 7/2005 | Yanagita et al. .......... 707/104.1 |
| 2005/0262446 A1 | | 11/2005 | Roh |
| 2006/0029373 A1 * | | 2/2006 | Nonaka et al. .............. 386/123 |

FOREIGN PATENT DOCUMENTS

JP 2003-202944 7/2003

OTHER PUBLICATIONS

U.S. Appl. No. 11/800,803, filed May 7, 2007, Unknown.

(Continued)

*Primary Examiner*—Gregory M Desire
(74) *Attorney, Agent, or Firm*—Oblon, Spivak, McClelland, Maier & Neustadt, L.L.P.

(57) ABSTRACT

An image processing apparatus includes a feature value extractor extracting a feature value from an image; a setting unit setting setting information for applying a process to the image; a recorder recording the setting information in association with the feature value in a data recording medium; a synchronizing unit synchronizing the feature value in the recording medium with the extracted feature value; a reader reading, when the feature value in the recording medium is synchronized with the extracted feature value, setting information recorded in association with the synchronized feature value from the recording medium; a reflecting unit reflecting the process applied to the image on the basis of the read setting information; a display image generator generating a display image by combining an object indicating the read setting information with the processed image; and a selector selectively supplying the setting information to the reflecting unit or the display image generator.

10 Claims, 17 Drawing Sheets

OTHER PUBLICATIONS

U.S. Appl. No. 11/675,309, filed Feb. 15, 2007, Ando, et al.
U.S. Appl. No. 11/676,833, filed Feb. 20, 2007, Node, et al.
U.S. Appl. No. 11/909,587, filed Sep. 21, 2007, Kondo, et al.

* cited by examiner

IMAGE PROCESSING APPARATUS AND METHOD, PROGRAM RECORDING MEDIUM, AND PROGRAM THEREFOR

CROSS REFERENCES TO RELATED APPLICATIONS

The present invention contains subject matter related to Japanese Patent Application JP 2006-054950 filed in the Japanese Patent Office on Mar. 1, 2006, the entire contents of which are incorporated herein by reference.

BACKGROUND OF THE INVENTION

1. Field of the Invention

The present invention relates to image processing apparatuses and methods, program recording media, and programs therefor. In particular, the present invention relates to an image processing apparatus and method for easily editing a predetermined process to be applied to an image when the predetermined process is applied to the image every time the image is played back and the processed image is reproduced by storing the process to be applied to the image and a feature value of the image in association with each other, a program recording medium, and a program therefor.

2. Description of the Related Art

Techniques for easily processing images are becoming common.

One of the most common techniques for editing an image captured with a video camera or the like is known as linear editing. Linear editing applies various processes to the image while playing back the original image data and records the result of the process or the processed image in another recording medium.

When the original image data is labeled "copy once", it is not allowed with the above-described linear editing to play back and edit the image recorded in a video cassette recorder (VCR) and then to record the edited image.

To solve such a problem, a method of storing an operation specifying a process of editing an image is proposed in Japanese Unexamined Patent Application Publication No. 2003-202944.

SUMMARY OF THE INVENTION

Linear editing can edit an image in accordance with a corresponding time code indicating the time of the image by simultaneously communicating the image and the time code. However, the time code is included inside a consumer VCR, and it is practically difficult to communicate the time code to the outside. An image is not synchronized with an operation specifying a process of editing the image. Therefore, when such an operation is simply stored, it is difficult to apply the process to the image in precise synchronization with playback of the image.

A user who wants to edit an image may want to compare the details of plural editing operations. Since it is difficult to display all the results of the editing operations on one display and compare the results with one another, it is necessary for the user to have skills that can be learned only if the user first has enough editing experience to be able to edit the image as desired. Besides the fact that the editing operation itself is complicated, the user has difficulty editing the image as desired.

It is desirable to easily edit the details of a predetermined process to be applied to an image when the predetermined process is accurately applied to the image every time the image is played back and the processed image is reproduced, without applying the process to the original image data, by storing the process to be applied to the image and a feature value of the image in association with each other.

An image processing apparatus according to an embodiment of the present invention includes the following elements: feature-value extracting means for extracting a feature value from an image; setting means for setting setting information for applying a process to the image; recording means for recording the setting information in association with the feature value of the image in a data recording medium; synchronizing means for synchronizing the feature value in the data recording medium with the feature value extracted by the feature-value extracting means; reading means for reading, when the feature value in the data recording medium is synchronized by the synchronizing means with the feature value extracted by the feature-value extracting means, setting information recorded in association with the synchronized feature value from the data recording medium; reflecting means for reflecting the process applied to the image on the basis of the setting information read by the reading means; display-image generating means for generating a display image by combining an object indicating the setting information read by the reading means with the image in which the process applied to the image is reflected by the reflecting means; and selecting means for selectively supplying the setting information read by the reading means to the reflecting means or the display-image generating means.

The feature-value extracting means may extract a sum of pixel values of pixels within a predetermined region included in the image as the feature value.

The image processing apparatus may further include operation means for performing an operation specifying the process to be applied to the image. The setting means may set the setting information for applying the process to the image on the basis of details of the operation of the operation means. The recording means may record the details of the operation in association with the feature value of the image in the data recording medium.

The setting information may include information indicating whether the setting information itself is being edited.

When the setting information includes the information indicating that the setting information itself is being edited, the reflecting means may supply the image to the display-image generating means without changing the image, and the display-image generating means may generate the display image by combining the image supplied from the reflecting means with a window, serving as the object, indicating a range in which the process is applied on the basis of the setting information read by the reading means.

When the setting information includes no information indicating that the setting information itself is being edited, the selecting means may selectively supply the setting information read by the reading means only to the reflecting means, the reflecting means may reflect the process applied to the image on the basis of the setting information read by the reading means, and the display-image generating means may regard the image in which the process applied to the image is reflected by the reflecting means as the display image.

The synchronizing means may include the following elements: search-position feature-value extracting means for sequentially extracting, from the data recording medium in which the setting information for applying the process to the image is recorded in association with the feature value of the image, the feature value as a search-position feature value; and comparing means for sequentially comparing the feature value extracted by the feature-value extracting means with the search-position feature value. When a comparison result shows that the feature value extracted by the feature-value extracting means matches the search-position feature value, it may be regarded that the feature value in the data recording medium in which the setting information for applying the process to the image is recorded in association with the feature value of the image is synchronized with the feature value extracted by the feature-value extracting means.

An image processing method according to an embodiment of the present invention includes the steps of: extracting a feature value from an image; setting setting information for applying a process to the image; recording the setting information in association with the feature value of the image in a data recording medium; synchronizing the feature value in the data recording medium with the extracted feature value; reading, when the feature value in the data recording medium is synchronized with the extracted feature value, setting information recorded in association with the synchronized feature value from the data recording medium; reflecting the process applied to the image on the basis of the read setting information; generating a display image by combining an object indicating the read setting information with the image in which the process applied to the image is reflected; and selectively supplying the read setting information so as to be usable in reflecting the process applied to the image or in generating the display image.

A program recording medium according to an embodiment of the present invention has recorded therein a program including the steps of: extracting a feature value from an image; setting setting information for applying a process to the image; recording the setting information in association with the feature value of the image in a data recording medium; synchronizing the feature value in the data recording medium with the extracted feature value; reading, when the feature value in the data recording medium is synchronized with the extracted feature value, setting information recorded in association with the synchronized feature value from the data recording medium; reflecting the process applied to the image on the basis of the read setting information; generating a display image by combining an object indicating the read setting information with the image in which the process applied to the image is reflected; and selectively supplying the read setting information so as to be usable in reflecting the process applied to the image or in generating the display image.

A program according to an embodiment of the present invention allows a computer to execute a process including the steps of: extracting a feature value from an image; setting setting information for applying a process to the image; recording the setting information in association with the feature value of the image in a data recording medium; synchronizing the feature value in the data recording medium with the extracted feature value; reading, when the feature value in the data recording medium is synchronized with the extracted feature value, setting information recorded in association with the synchronized feature value from the data recording medium; reflecting the process applied to the image on the basis of the read setting information; generating a display image by combining an object indicating the read setting information with the image in which the process applied to the image is reflected; and selectively supplying the read setting information so as to be usable in reflecting the process applied to the image or in generating the display image.

According to the image processing apparatus and method and the program therefor of the embodiments of the present invention, a feature value is extracted from an image; setting information for applying a process to the image is set; the setting information is recorded in association with the feature value of the image in a data recording medium; the feature value in the data recording medium is synchronized with the extracted feature value; when the feature value in the data recording medium is synchronized with the extracted feature value, setting information recorded in association with the synchronized feature value is read from the data recording medium; the process to be applied to the image is reflected on the basis of the read setting information; a display image is generated by combining an object indicating the read setting information with the image in which the process applied to the image is reflected; and the read setting information is selectively supplied so as to be usable in reflecting the process applied to the image or in generating the display image.

The image processing apparatus according to the embodiment of the present invention may be an independent apparatus or a block configured to perform an image processing process.

According to the embodiments of the present invention, every time an image is played back, a predetermined process to be applied to the image to reproduce the processed image, without applying the process to the original image data, can be easily edited.

According to the embodiments of the present invention, the user can visually and easily recognize the editing of the predetermined process to be applied to the image to reproduce the image every time the image is played back without applying the process to the original image data, and, as a result, the process can be easily edited.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the embodiments of the invention disclosed in the embodiment are described in the claims. That is, the description does not deny the existence of embodiments of the present invention that are described in the embodiment but not claimed in the invention of this application, i.e., the existence of embodiments of the present invention that in future may be claimed by a divisional application, or that may be additionally claimed through amendments.

Figure 4:
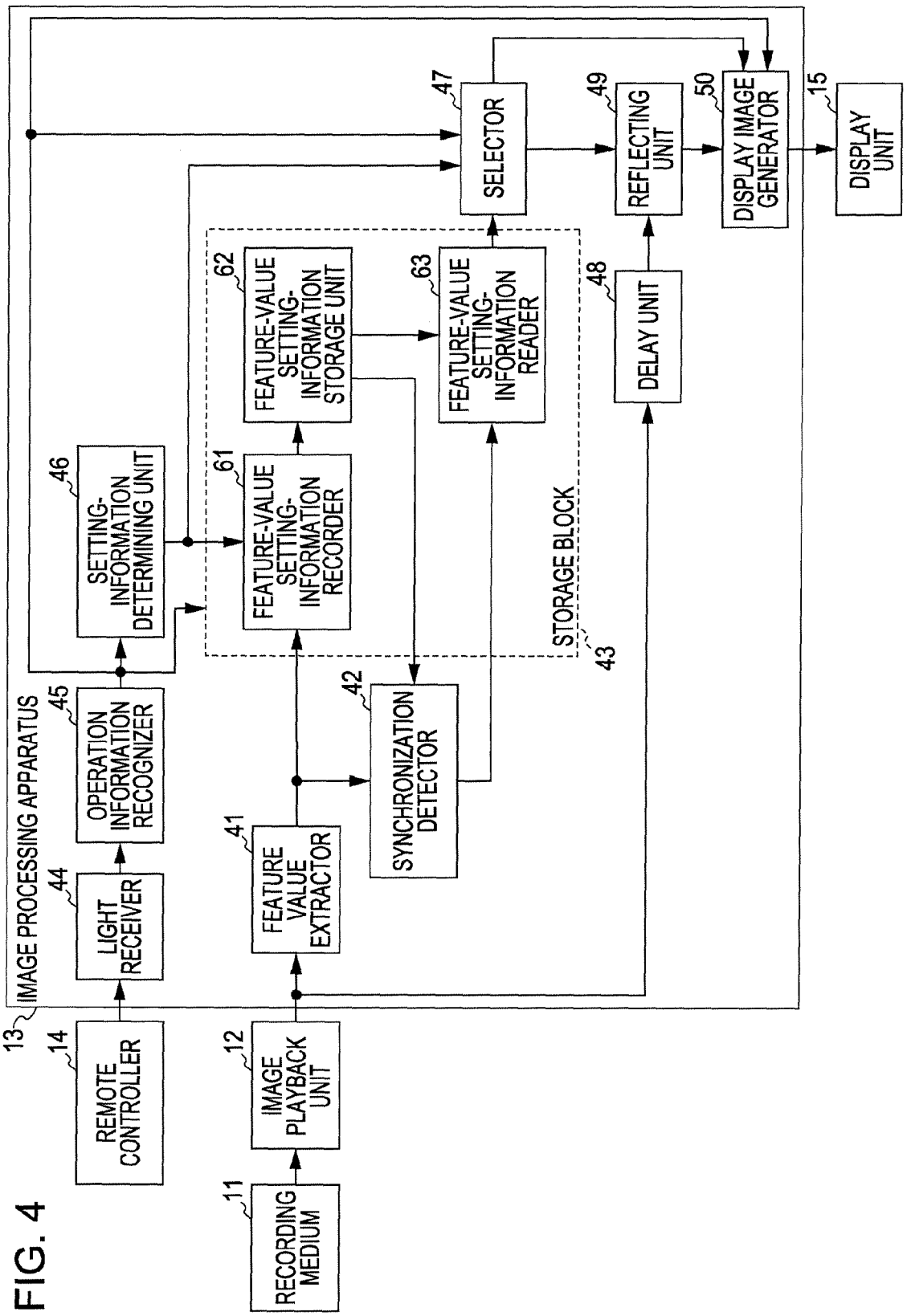
FIG. 4 is a block diagram of the structure of an image processing apparatus according to an embodiment of the present invention.

That is, an image processing apparatus according to an embodiment of the present invention includes the following elements: feature-value extracting means (e.g., a feature value extractor 41 shown in FIG. 4) for extracting a feature value from an image; setting means (e.g., a setting-information determining unit 46 shown in FIG. 4) for setting setting information for applying a process to the image; recording means (e.g., a feature-value setting-information recorder 61 shown in FIG. 4) for recording the setting information in association with the feature value of the image in a data recording medium; synchronizing means (e.g., a synchronization detector 42 shown in FIG. 4) for synchronizing the feature value in the data recording medium with the feature value extracted by the feature-value extracting means; reading means (e.g., a feature-value setting-information reader 63 shown in FIG. 4) for reading, when the feature value in the data recording medium is synchronized by the synchronizing means with the feature value extracted by the feature-value extracting means, setting information recorded in association with the synchronized feature value from the data recording medium; reflecting means (e.g., a reflecting unit 49 shown in FIG. 4) for reflecting the process applied to the image on the basis of the setting information read by the reading means; display-image generating means (e.g., a display image generator 50 shown in FIG. 4) for generating a display image by combining an object indicating the setting information read by the reading means with the image in which the process applied to the image is reflected by the reflecting means; and selecting means (e.g., a selector 47 shown in FIG. 4) for selectively supplying the setting information read by the reading means to the reflecting means or the display-image generating means.

The feature-value extracting means (e.g., the feature value extractor 41 shown in FIG. 4) may extract, as the feature value, the sum of pixel values of pixels within a predetermined region included in the image.

The image processing apparatus may further include operation means (e.g., a remote controller 14 shown in FIG. 4) for performing an operation specifying the process to be applied to the image. The setting means (e.g., the setting-information determining unit 46 shown in FIG. 4) may set the setting information for applying the process to the image on the basis of the details of the operation of the operation means. The recording means may record the details of the operation in association with the feature value of the image in the data recording medium.

The setting information may include information indicating whether the setting information itself is being edited.

When the setting information includes the information indicating that the setting information itself is being edited, the reflecting means (e.g., the reflecting unit 49 shown in FIG. 4) may supply the image to the display-image generating means without changing the image, and the display-image generating means (e.g., the display image generator 50 shown in FIG. 4) may generate the display image by combining the image supplied from the reflecting means with a window, serving as the object, indicating the range in which the process is applied on the basis of the setting information read by the reading means.

When the setting information includes no information indicating that the setting information itself is being edited, the selecting means (e.g., the selector 47 shown in FIG. 4) may selectively supply the setting information read by the reading means only to the reflecting means, the reflecting means (e.g., the reflecting unit 49 shown in FIG. 4) reflects the process applied to the image on the basis of the setting information read by the reading means, and the display-image generating means regards the image in which the process applied to the image is reflected by the reflecting means as the display image.

The synchronizing means (e.g., the synchronization detector 42 shown in FIG. 4) may include search-position feature-value extracting means (e.g., a search-position feature-value reader 104 shown in FIG. 7) for sequentially extracting, from the data recording medium in which the setting information for applying the process to the image is recorded in association with the feature value of the image, the feature value as a search-position feature value, and comparing means (e.g., a comparator 103 shown in FIG. 7) for sequentially comparing the feature value extracted by the feature-value extracting means with the search-position feature value. When the comparison result shows that the feature value extracted by the feature-value extracting means matches the search-position feature value, it may be regarded that the feature value in the data recording medium in which the setting information for applying the process to the image is recorded in association with the feature value of the image is synchronized with the feature value extracted by the feature-value extracting means.

Figure 11:
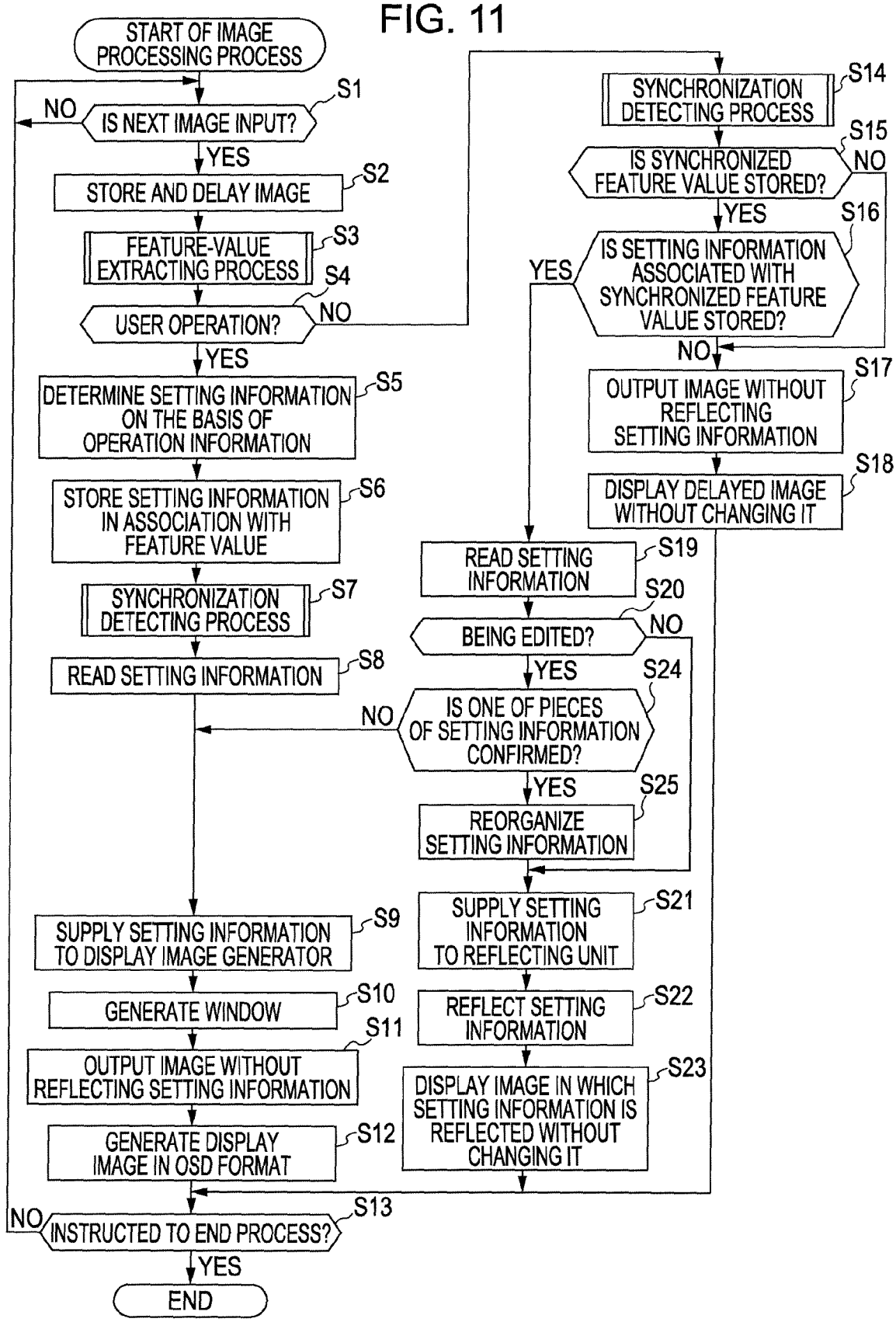
FIG. 11 is a flowchart of an image processing process performed by the image processing apparatus shown in FIG. 4.

An image processing method according to an embodiment of the present invention includes the steps of: extracting a feature value from an image (e.g., step S3 of the flowchart shown in FIG. 11); setting setting information for applying a process to the image (e.g., step S5 of the flowchart shown in FIG. 11); recording the setting information in association with the feature value of the image in a data recording medium (step S6 of the flowchart shown in FIG. 11); synchronizing the feature value in the data recording medium with the extracted feature value (e.g., step S7 of the flowchart shown in FIG. 11); reading, when the feature value in the data recording medium is synchronized with the extracted feature value, setting information recorded in association with the synchronized feature value from the data recording medium (step S8 of the flowchart shown in FIG. 11); reflecting the process applied to the image on the basis of the read setting information (step S22 of the flowchart shown in FIG. 11); generating a display image by combining an object indicating the read setting information with the image in which the process applied to the image is reflected (step S12 of the flowchart shown in FIG. 11); and selectively supplying the read setting information so as to be usable in reflecting the process applied to the image or in generating the display image (steps S9 and S21 of the flowchart shown in FIG. 11).

Figure 1:
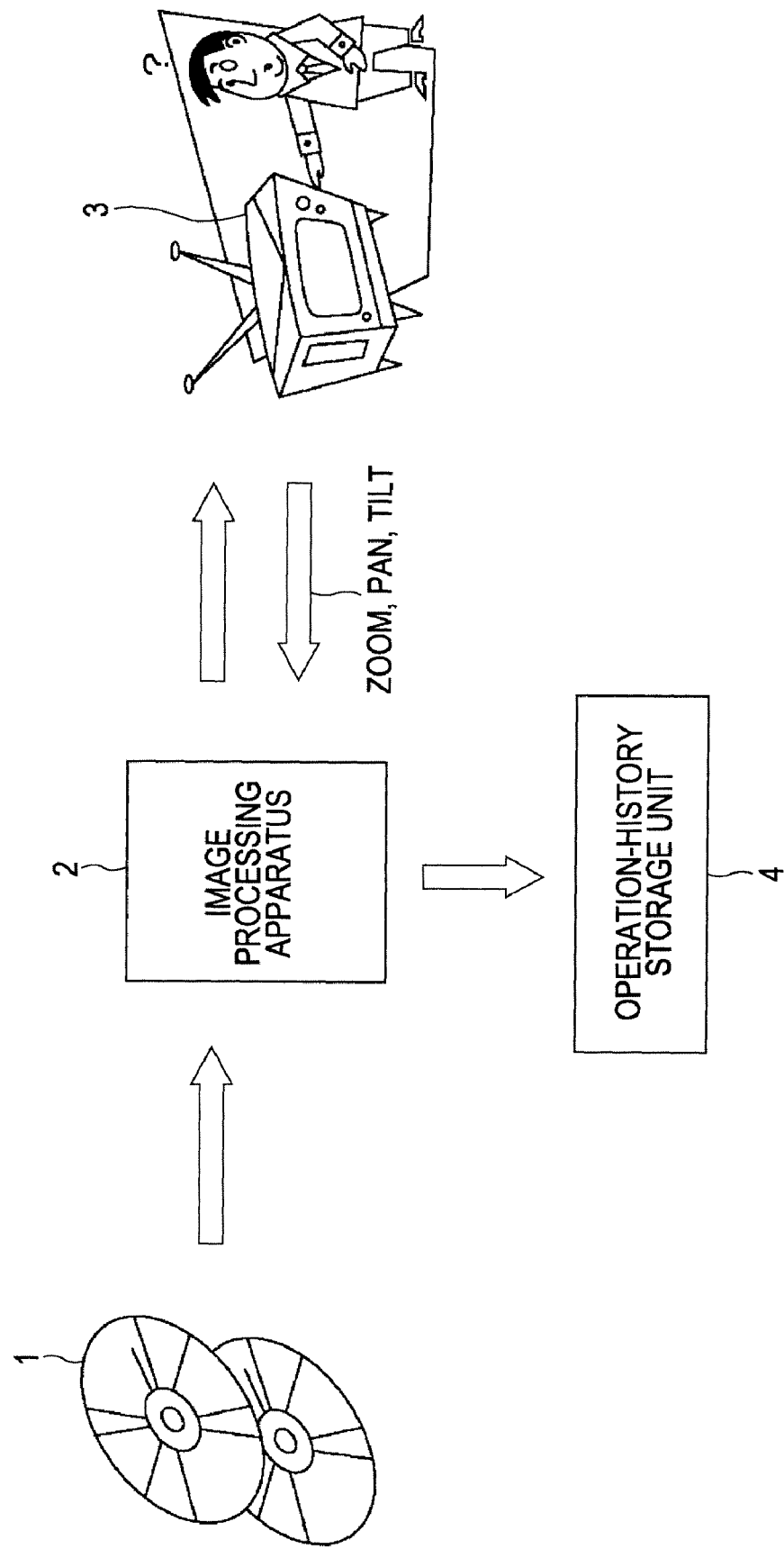
FIG. 1 illustrates the concept of an image processing apparatus according to an embodiment of the present invention.
Figure 2:
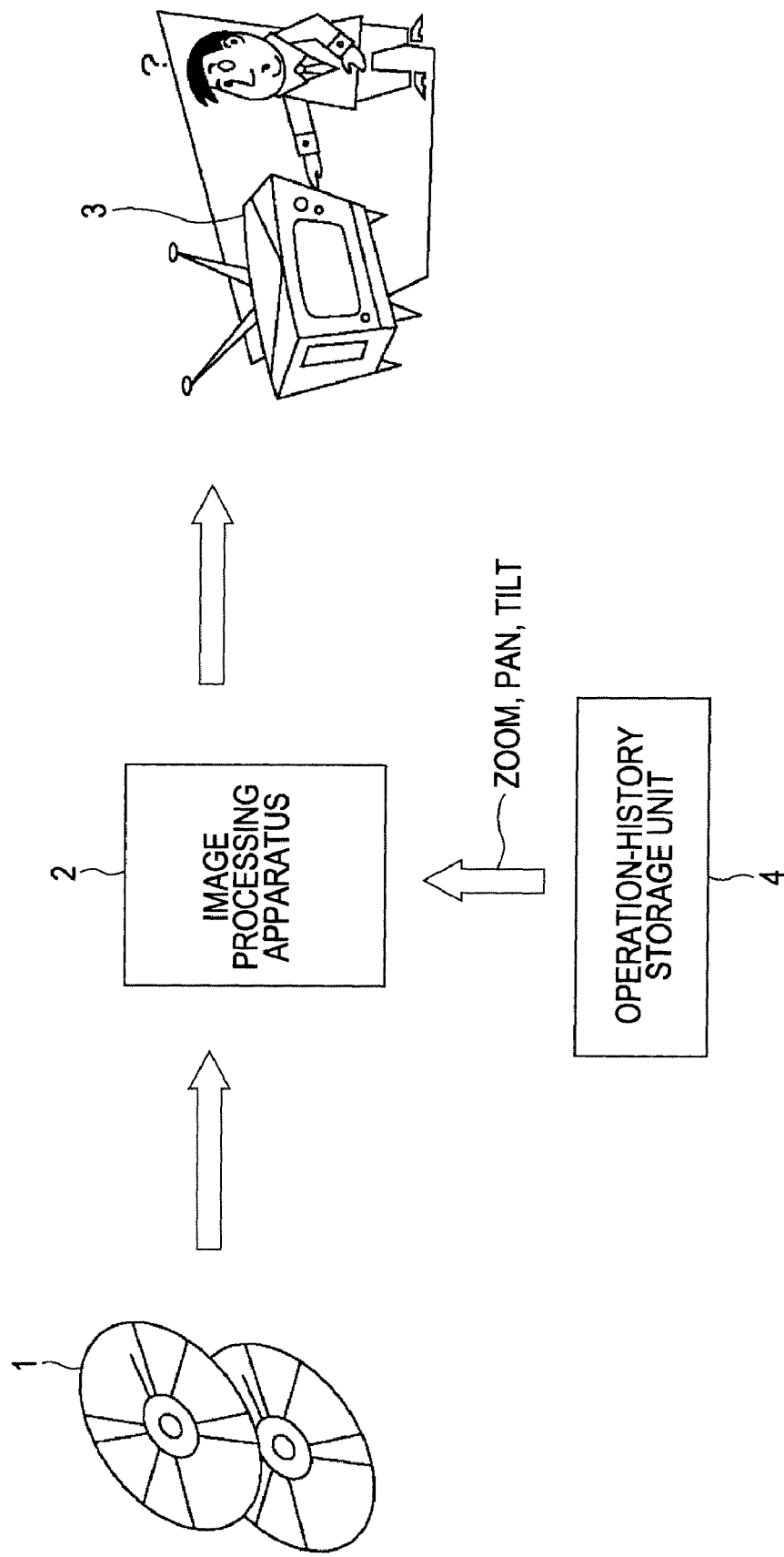
FIG. 2 illustrates the concept of the image processing apparatus according to the embodiment of the present invention.

Referring now to FIGS. 1 and 2, the concept of an image processing apparatus according to an embodiment of the present invention will be described. The image processing apparatus according to the embodiment of the present invention applies a process specified by a user to a pre-recorded image and displays the processed image. At the same time, the image processing apparatus extracts a feature value of the image and stores information about the details of the process in association with the feature value. Furthermore, when playing back the pre-recorded image, the image processing apparatus reads the stored information about the details of the process, applies the process to the image, and displays the processed image.

More specifically, the operation of an image processing apparatus 2 is divided into two modes: recording mode and playback mode.

In the recording mode, as shown in FIG. 1, the image processing apparatus 2 displays on a display unit 3 an image played back by a digital versatile disc (DVD) player or the like from a recording medium 1, such as a DVD, in which content including a moving image is recorded in advance. In this state, when a user operates a remote controller or the like to specify a process (e.g., zoom, pan, or tilt) to be applied to a desired image, the image processing apparatus 2 generates setting information associated with the details of the user operation, applies the process associated with the setting information to the image, and displays the processed image on the display unit 3. Furthermore, the image processing apparatus 2 extracts a feature value from the image and stores the setting information in association with the extracted feature value in an operation-history storage unit 4. Since the operation in the recording mode can be repeated, the details of the process can be edited. In other words, the recording mode includes an editing mode.

Next, in the playback mode, as shown in FIG. 2, the image processing apparatus 2 reads an image played back by the DVD player or the like from the recording medium 1 in which content including a moving image is recorded in advance and extracts a feature value. At the same time, in synchronization with the feature value of the image read from the recording medium 1, the image processing apparatus 2 reads the setting information recorded in association with the feature value in the operation-history storage unit 4, applies the process to the image on the basis of the read setting information, and displays the processed image on the display unit 3.

In the recording mode (including the editing mode), when editing is repeated a plurality of times at the same timing, pieces of information indicating the plural editing operations are displayed in the playback mode such that the user can view and recognize the information. Viewing the information indicating the editing operations on the image being played back, the user determines the details of a process to be applied to the image.

Figure 3:
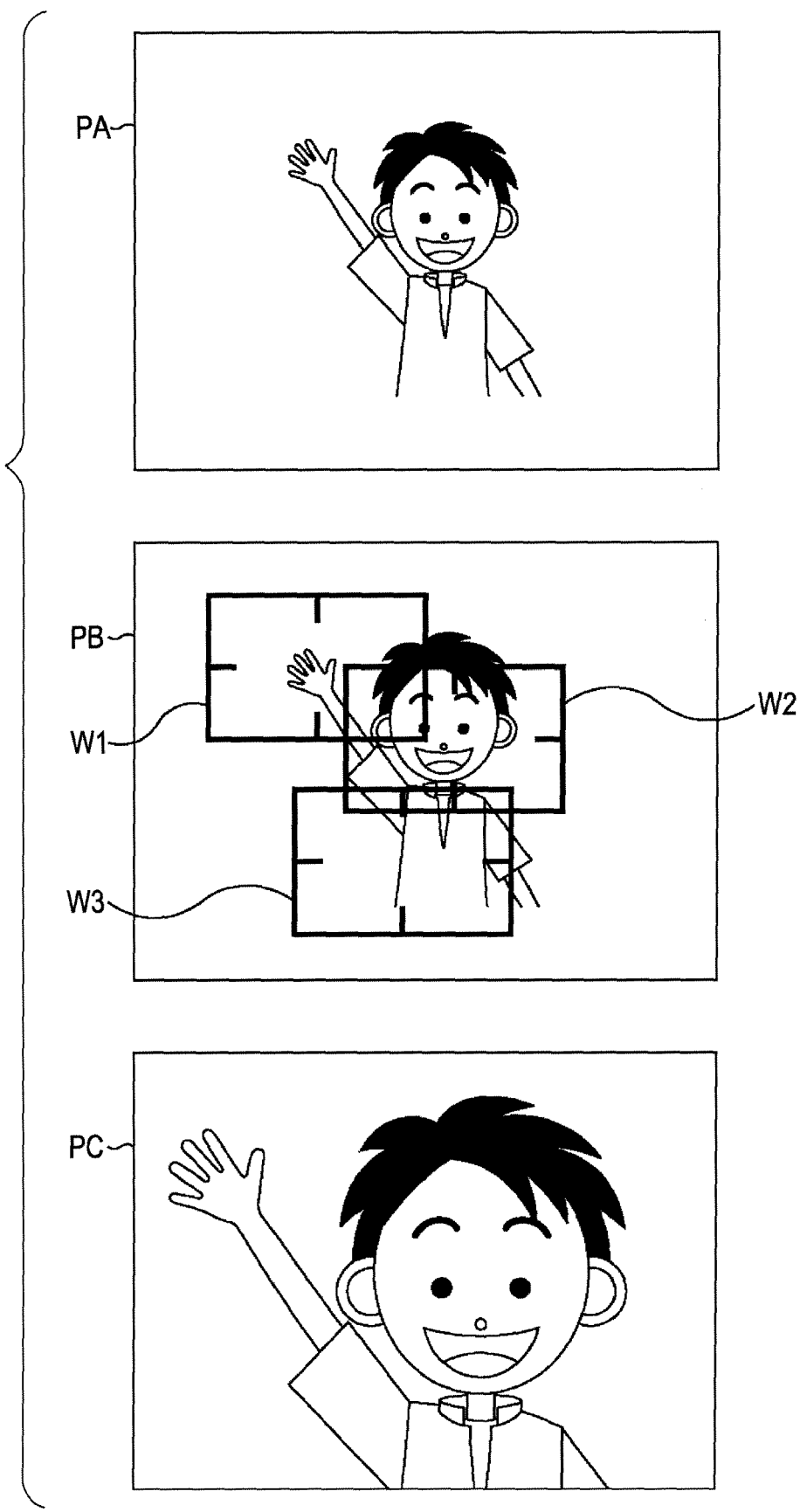
FIG. 3 illustrates the concept of the image processing apparatus according to the embodiment of the present invention.

More specifically, for example, when zoom is applied a plurality of times to a supplied image PA shown at the top of FIG. 3, the image processing apparatus 2 stores the plural zoom operations in the operation-history storage unit 4. Until one of the zoom operations is selected, pieces of information indicating the zoom positions of the zoom operations are displayed on the display unit 3 as windows W1 to W3 on an image PB, as shown in the middle of FIG. 3. With this operation, the user can view and recognize the positions at which editing is applied. When one of the windows is selected, as shown at the bottom of FIG. 3, a process to be applied to the image is selected, a corresponding zoom operation is applied to the image, and the processed image is displayed. At the bottom of FIG. 3, the window W2 is selected, and a corresponding zoom operation is applied to generate an image PC, which is displayed on the display unit 3. At this point, only the setting information relating to the editing associated with the designated process remains in the operation-history storage unit 4.

With the above-described operation, the image processing apparatus 2 stores only the details of the process applied to the pre-recorded image, and does not record the result of the process or the processed image. In this way, the image processing apparatus 2 can repeatedly play back the result of the process or the processed image. As a result, the image processing apparatus 2 can repeatedly apply various image processes to a pre-recorded "copy-once" image whose number of reproductions is limited. Because the user can view and recognize the plural editing operations, the user can edit the image as desired.

The image processing apparatus 2, which has been described with reference to FIGS. 1 and 2, will be described in detail below.

FIG. 4 is a diagram of the structure of an image processing apparatus 13 according to an embodiment of the present invention, which corresponds to the image processing apparatus 2 shown in FIGS. 1 and 2.

An image playback unit 12 decodes an image that has been preliminarily encoded in a predetermined format and recorded in a recording medium 11, which corresponds to the recording medium 1 shown in FIGS. 1 and 2, and sequentially supplies decoded images to a feature value extractor 41 and a delay unit 48.

The feature value extractor 41 extracts a feature value of one of the images sequentially supplied from the image playback unit 12 and supplies the feature value to a synchronization detector 42 and a feature-value setting-information recorder 61 in a storage block 43. The structure of the feature value extractor 41 will be described later in detail with reference to FIG. 5.

A remote controller 14 includes keys and buttons. As shown in FIGS. 1 and 2, the remote controller 14 is operated by the user when the user wants to specify the details of a process to be applied to a desired image. In accordance with the user operation, the remote controller 14 generates an operation signal and a light emitting pattern such as an infrared light emitting pattern in accordance with the generated operation signal and emits light to a light receiver 44 of the image processing apparatus 13. The remote controller 14 will be described later in detail with reference to FIG. 8.

The light receiver 44 converts the light emitting pattern of the remote controller 14 into the operation signal of the remote controller 14 and supplies the operation signal to an operation information recognizer 45. On the basis of the operation signal supplied from the light receiver 44, the operation information recognizer 45 recognizes operation information associated with the user-desired process to be applied to the image and supplies the recognition result or the operation signal to the setting-information determining unit 46. The storage block 43 may be turned on or off on the basis of the operation information from the remote controller 14. When the operation information recognizer 45 recognizes the operation information that turns on or off the storage block 43, the operation information recognizer 45 turns on or off the operation of the storage block 43. The operation information may include an operation selecting a window generated on the basis of the above-described operation signal. When the operation is to select a window, the operation information recognizer 45 generates a signal indicating the operation and supplies the signal to a selector 47 and a display image generator 50.

On the basis of the operation information supplied from the operation information recognizer 45, the setting-information determining unit 46 determines, for a reflecting unit 49 described later, setting information for specifying the details of the process to be applied to the image and supplies the setting information to the feature-value setting-information recorder 61 and the selector 47. When information indicating that one of the above-described plural windows is selected to select one of the plural operations applied at the same timing of the feature value is supplied from the operation information recognizer 45 to the setting-information determining unit 46, the setting-information determining unit 46 instructs the feature-value setting-information recorder 61 in the storage block 43 to delete the setting information relating to the unselected process(es).

The feature-value setting-information recorder 61 in the storage block 43 stores the feature value supplied from the feature value extractor 41 and the setting information supplied from the setting-information determining unit 46 in association with each other in a feature-value setting-information storage unit 62 (corresponding to the operation-history storage unit 4 shown in FIGS. 1 and 2). When one of the above-described plural windows is selected to select one of the plural operations applied at the same timing of the feature value and when the feature-value setting-information recorder 61 is instructed to delete the setting information relating to the unselected process(es), the feature-value setting-information recorder 61 deletes the corresponding setting information from the feature-value setting-information storage unit 62.

The synchronization detector 42 searches for, among feature values (search-position feature values described later) stored in the feature-value setting-information storage unit 62, a feature value (playback-position feature value described later) of an image being played back by the image playback unit 12, which has been supplied from the feature value extractor 41, and, when the same feature value is detected, the synchronization detector 42 supplies the detection result as the image's synchronization position to a feature-value setting-information reader 63. The structure of the synchronization detector 42 will be described later in detail with reference to FIG. 7.

When the feature-value setting-information reader 63 obtains the feature value (search-position feature value) detected as the synchronization position by the synchronization detector 42, the feature-value setting-information reader 63 reads the setting information stored in association with the feature value in the feature-value setting-information storage unit 62 and supplies the setting information to the selector 47. When a plurality of pieces of setting information being associated with the feature value detected as the synchronization position are stored, the feature-value setting-information reader 63 reads all the pieces of setting information. That is, when a plurality of processes are specified at the same time and corresponding operation history remains, the feature-value setting-information reader 63 reads all the pieces of setting information and supplies the setting information to the selector 47.

When the setting information is supplied from the setting-information determining unit 46, even if the setting information is supplied at the same time from the feature-value setting-information reader 63, the selector 47 supplies the setting information from the setting-information determining unit 46 to the reflecting unit 49. When no setting information is supplied from the setting-information determining unit 46 and when the setting information is supplied from the feature-value setting-information reader 63, the selector 47 supplies the setting information supplied from the feature-value setting-information reader 63 to the reflecting unit 49. When no setting information is supplied from the setting-information determining unit 46 or the feature-value setting-information reader 63, the selector 47 supplies no setting information to the reflecting unit 49.

When it has not been reported from the operation information recognizer 45 that the process to be applied to the image is finally determined or when the setting information includes no information indicating that the setting information itself has been finally confirmed, even if the setting information is supplied from the setting-information determining unit 46, the selector 47 does not supply the setting information to the reflecting unit 49, but supplies the setting information to the display image generator 50. When it has been reported from the operation information recognizer 45 that process to be applied to the image is finally confirmed, only the setting information relating to the determined process is supplied from the setting-information determining unit 46 to the selector 47. Thus, the selector 47 supplies the setting information to the reflecting unit 49, but does not supply the setting information to the display image generator 50.

The delay unit 48 temporarily stores an image supplied from the image playback unit 12 for a processing delay time of the feature value extractor 41, the synchronization detector 42, the storage block 43, and the selector 47 and outputs the image to the reflecting unit 49. When the setting information is supplied from the selector 47, the reflecting unit 49 reflects the process to be applied to the image supplied from the delay unit 48 in the image and supplies the processed image to the display image generator 50. When no setting information is supplied from the selector 47, the reflecting unit 49 supplies the image supplied from the delay unit 48 to the display image generator 50 without changing the image.

On the basis of the setting information supplied from the selector 47, the display image generator 50 applies the process to the image supplied from the reflecting unit 49 and displays the processed image on the display unit 15. Specifically, when the image is supplied from the reflecting unit 49 but nothing is supplied from the selector 47, the display image generator 50 displays the image supplied from the reflecting unit 49 on the display unit 15 without changing the image. When the image is supplied from the reflecting unit 49 and the setting information is supplied from the selector 47, the display image generator 50 displays, as shown in FIG. 3, windows overlapping the image from the reflecting unit 49 to generate a display screen in an on screen display (OSD) format on the basis of, for example, information indicating the zoom positions included in the setting information, and displays the image on the display unit 15. When the image in the OSD format is displayed, and when operation information selecting one of the windows is supplied from the operation information recognizer 45, the display image generator 50 displays the selected window in the OSD format so that the user can recognize the selected window.

Figure 5:
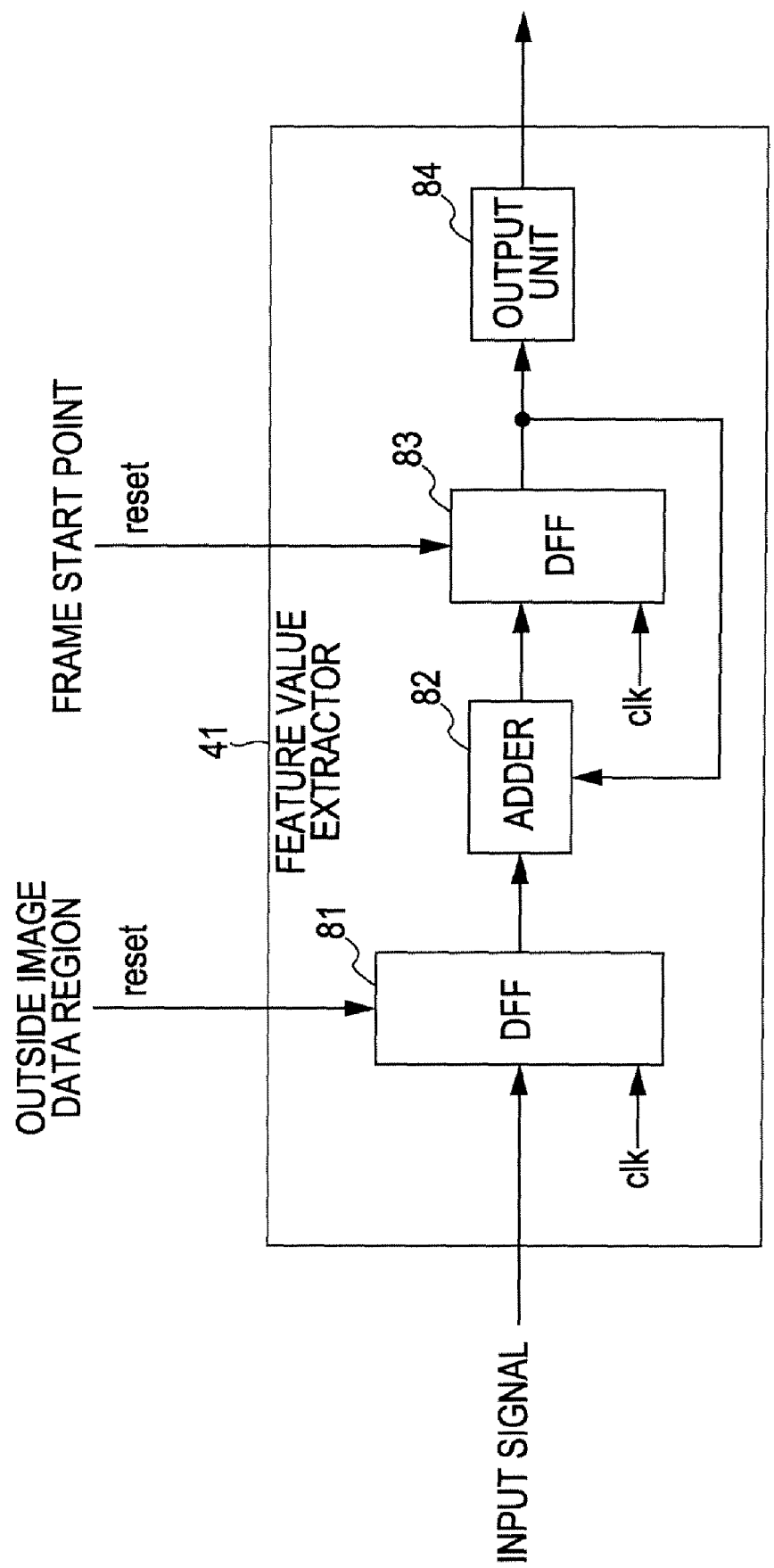
FIG. 5 is a block diagram of an exemplary structure of a feature value extractor shown in FIG. 4.

Referring now to FIG. 5, the detailed structure of the feature value extractor 41 will be described.

Figure 6:
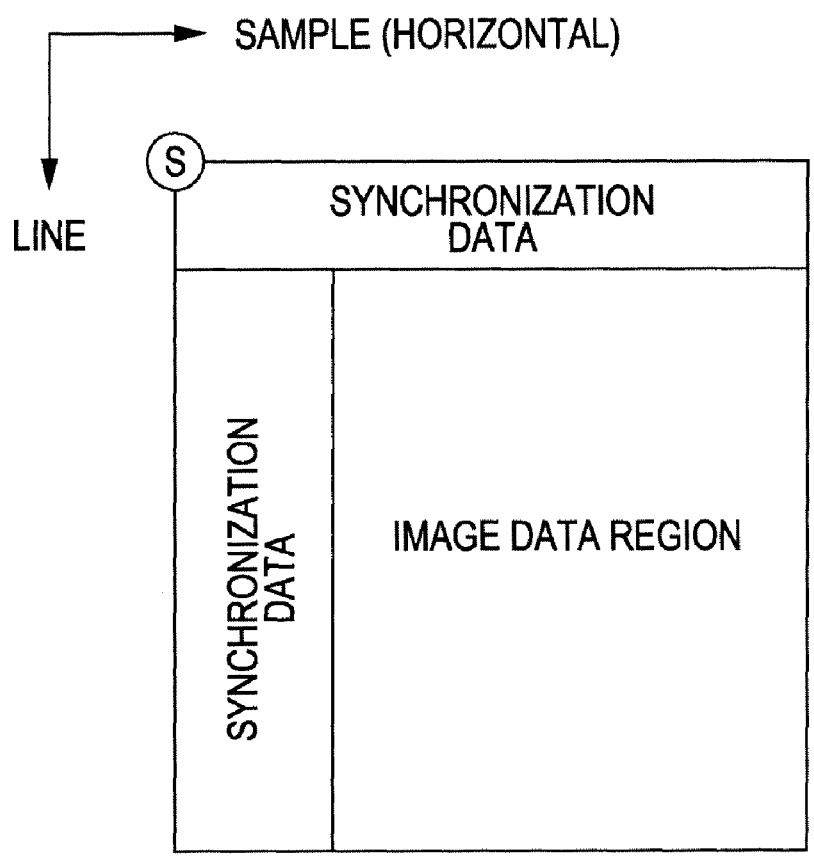
FIG. 6 is a diagram of an exemplary structure of an image signal.

A D flip flop (DFF) 81 stores an immediately preceding input signal and outputs the input signal to an adder 82 at a time at which a clock signal (clk) is input from a clock signal generator (not shown). When the input signal is outside an image data region of the image signal, a reset signal is input to the DFF 81 to delete the input signal, and no input signal is output. That is, as shown in FIG. 6, the image signal includes a synchronization data region and an image data region. When the input signal is synchronization data outside the image data region in accordance with positional information sequentially input starting from a frame start point S, which is the circled origin of horizontal samples and vertical lines shown in FIG. 6, a reset signal is input to the DFF 81, and the signal constituting the synchronization data is not output to the adder 82. In other words, of input signals constituting the image, the DFF 81 only supplies data in the image data region in synchronization with the clock signal to the adder 82.

The adder 82 adds the signal supplied from the DFF 81 and a signal supplied from a DFF 83 and outputs the sum to the DFF 83. More specifically, the adder 82 extracts the eight least significant bits of the sum of the signal supplied from the DFF 81 and the signal supplied from the DFF 83 and outputs the extracted eight bits to the DFF 83.

The DFF 83 supplies the signal supplied from the adder 82 to the adder 82 and an output unit 84 at a time at which a clock signal (clk) generated by a clock generator (not shown) is input thereto. When a signal at the frame start point S (the circled origin of horizontal samples and vertical lines shown in FIG. 6) is input to the DFF 83, a reset signal is input to the DFF 83 to delete the input signal, and no input signal is output. That is, of input signals constituting the image, the DFF 83 only supplies a value generated by accumulatively adding data in the image data region by the adder 82 to the output unit 84.

When a value in one frame (or one field) is supplied from the DFF 83 to the output unit 84, the output unit 84 outputs the value as a feature value of an image within that frame (or field). That is, the output unit 84 outputs the eight least significant bits of the value generated by accumulatively adding data in the image data region by the adder 82 as the feature value of that frame (or field). Since a feature value may be any information that can be used to recognize an image in units of frames, the feature value is not limited to the eight least significant bits of the value generated by accumulatively adding only data in the image data region (only pixel values). Alternatively, for example, the sum of pixel values within a predetermined region near the center of the image data region may be used as a feature value.

Figure 7:
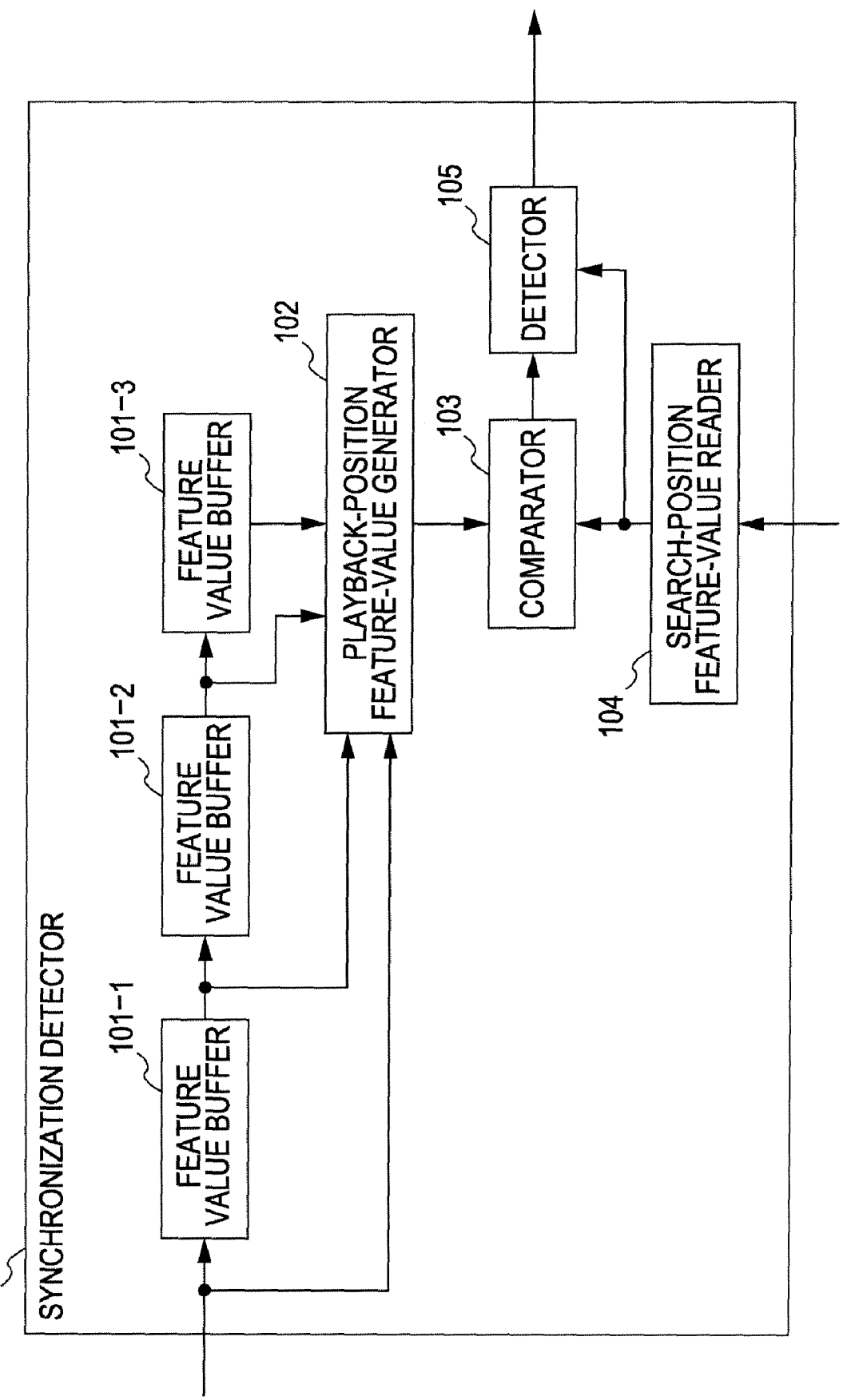
FIG. 7 is a block diagram of an exemplary structure of a synchronization detector shown in FIG. 4.

Referring now to FIG. 7, the detailed structure of the synchronization detector 42 will be described.

Feature value buffers 101-1 to 101-3 temporarily store the supplied feature value and sequentially output the stored feature value to a playback-position feature-value generator 102 and the feature value buffers 101-2 and 101-3 at a subsequent stage. Since there is no feature value buffer 101 subsequent to the feature value buffer 101-3, the feature value buffer 101-3 supplies the feature value only to the playback-position feature-value generator 102. The playback-position feature-value generator 102 sequentially obtains the feature values of the last three frames, including the most recent feature value, supplied from the feature value buffers 101-1 to 101-3, combines these feature values as playback position information (playback-position feature values) and outputs the playback position information to a comparator 103. That is, the playback-position feature-value generator 102 uses a total of four feature values of the most recent frame and the three previous frames as feature values for specifying the playback position and generates playback-position feature values.

A search-position feature-value reader 104 sequentially reads a set of four consecutive feature values stored in the feature-value setting-information storage unit 62 and supplies the four consecutive feature values as search-position feature values to the comparator 103 and a detector 105. The comparator 103 compares the playback-position feature values supplied from the playback-position feature-value generator 102 with the search-position feature values sequentially supplied from the search-position feature-value reader 104. When the comparator 103 finds the search-position feature values that match the playback-position feature values, the comparator 103 regards this as demonstrating that synchronization is detected and informs the detector 105 of the detection result demonstrating that synchronization is detected. The detector 105 outputs the search-position feature values supplied from the search-position feature-value reader 104 as the synchronization detection result at a time at which it is regarded by the comparator 103 that synchronization is detected.

Figure 8:
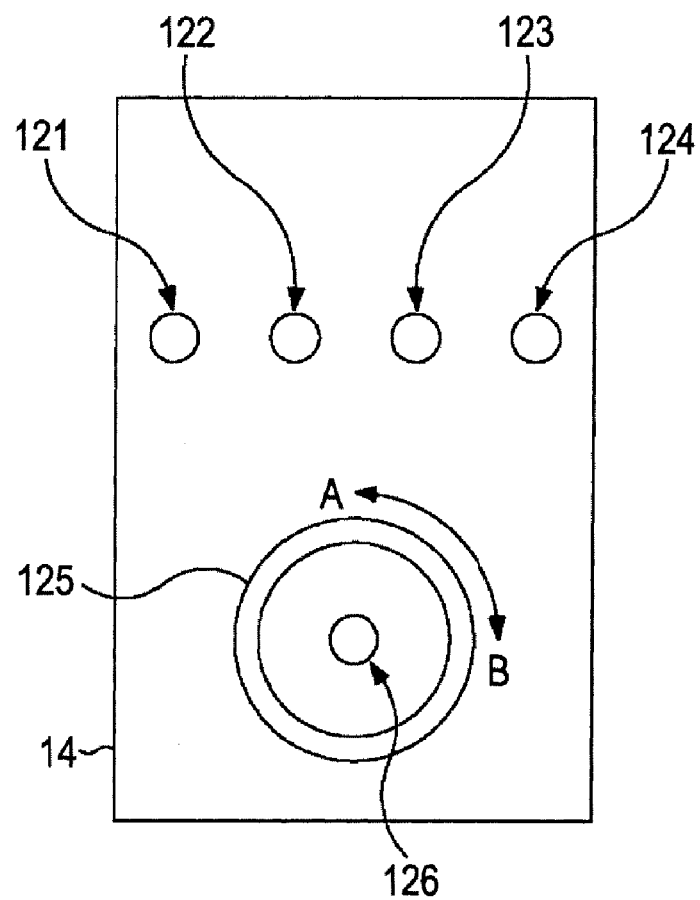
FIG. 8 is a diagram of an exemplary structure of a remote controller shown in FIG. 4.

Referring now to FIG. 8, the remote controller 14 will be described in detail.

A button 121 of the remote controller 14 is operated to turn on and off the storage block 43. A button 122 is a confirm button operated to confirm the zoom position and zoom magnification by operating the above-described window. Buttons 123 and 124 are selection buttons to be operated to change the selected one of the windows. A zoom ring 125 can be rotated in directions indicated by the arrow AB shown in FIG. 8 to set the zoom magnification according to the rotation. A zoom position stick 126 is a stick-type operation pointer to be operated to move the window position in the image, i.e., the zoom position.

Figure 9:
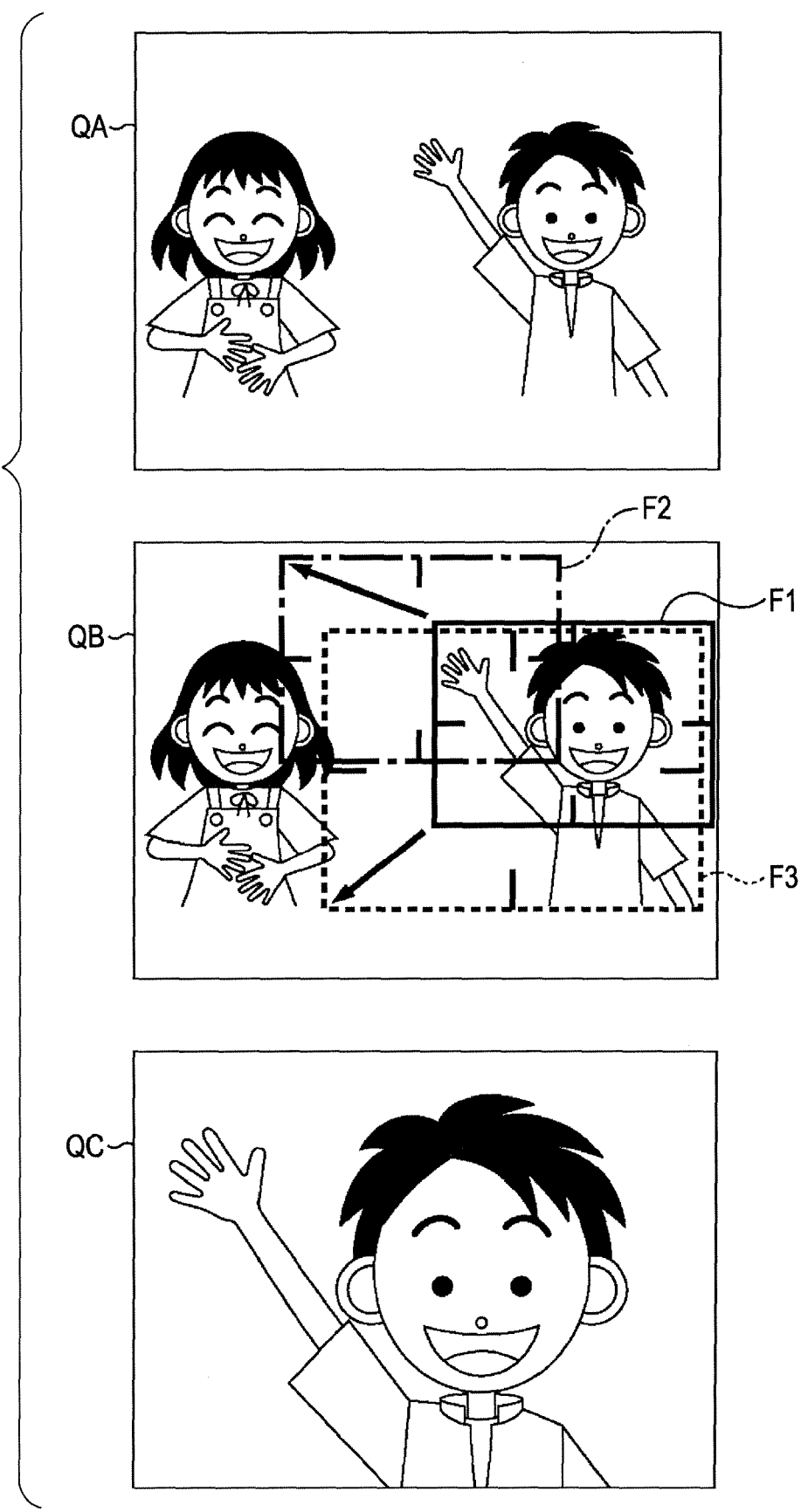
FIG. 9 illustrates the details of operation of the remote controller shown in FIG. 4.
Figure 10:
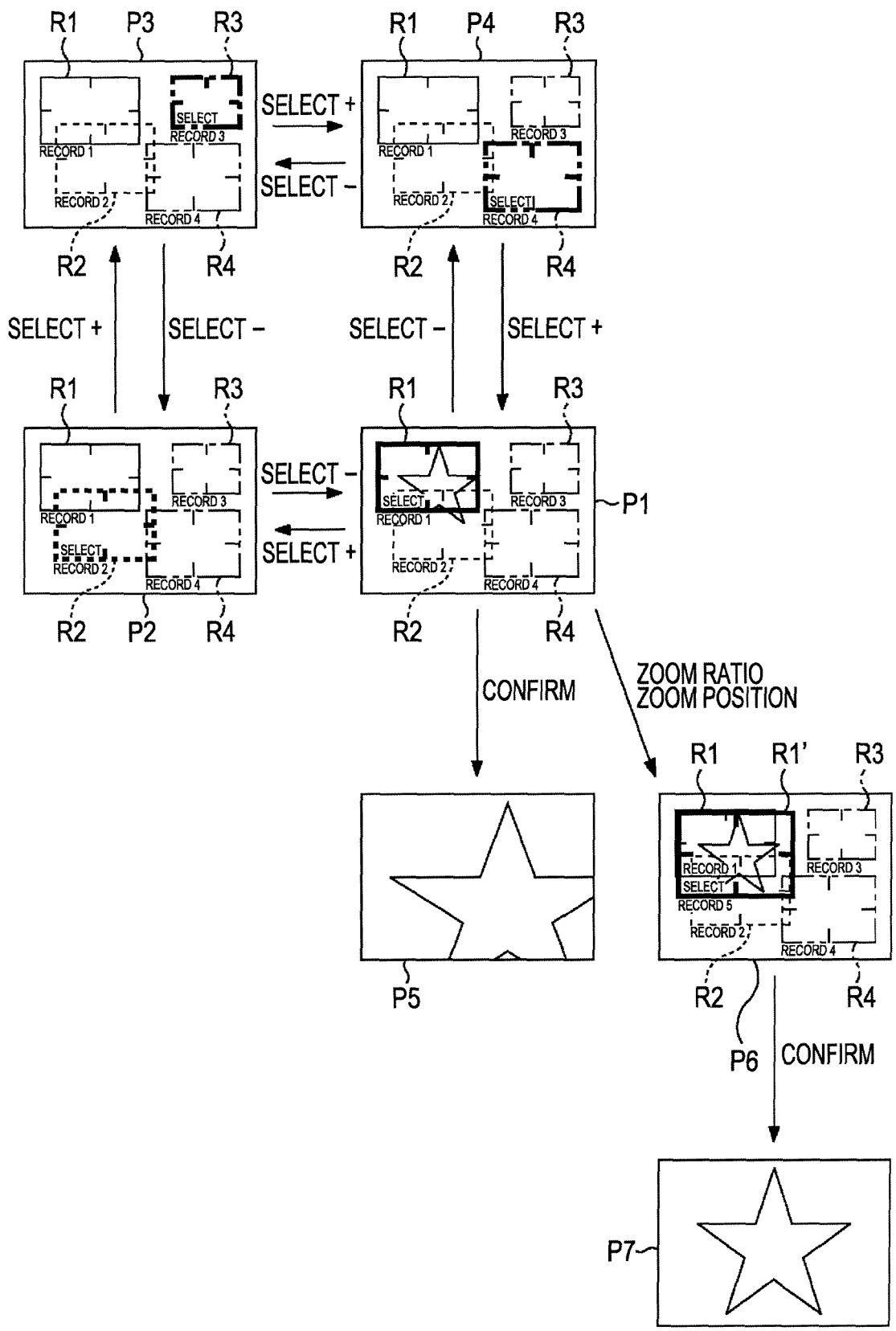
FIG. 10 illustrates the operation of the remote controller shown in FIG. 4.

Referring now to FIGS. 9 and 10, the specific details of processes involved in the operation of the remote controller 14 will be described.

Specifically, as shown in FIG. 9, the remote controller 14 is operated to set a zoom operation to be applied to an input image QA. When the zoom operation is not confirmed and is being edited, a window F1 (solid line) is displayed. When the zoom position stick 126 is operated in this state, the window F1 is moved in accordance with the operation, and a window F2 (dotted-chain line) is displayed. The size of the window F1 is changed by operating the zoom ring 125 in accordance with the zoom magnification and, for example, a window F3 (dotted line) is displayed. In the windows F1 to F3, the scale graduations are shown at the horizontal center and the vertical center so that the user can easily recognize the center of the windows F1 to F3.

To confirm the process to be applied to the image, the user operates the button 122, and an image QC shown at the bottom of FIG. 9 is displayed on the display unit 15.

In the above-described example, only one process is applied to the image, that is, only one window is selected. In contrast, the case in which plural processes are applied to the image will be described below.

That is, as shown in an image P1 at the center of FIG. 10, when windows R1 to R4 (the window R1 is indicated by a solid line, the window R2 is indicated by a dotted line, the window R3 is indicated by a dotted-chain line, and the window R4 is indicated by a double-dotted chain line) are displayed, that is, when four processes are set to be applied to the image, the selected window is displayed in bold. In the image P1, the window R1 is displayed in bold. The windows R1 to R4 are displayed as "record 1" to "record 4", showing that pieces of setting information based on corresponding operations are set.

When the button 123 is operated in the state of the image P1, as shown in an image P2, the window R2 is displayed in bold, showing that the window R2 is selected. When the button 123 is operated in the state of the image P2, as shown in an image P3, the window R3 is displayed in bold, showing that the window R3 is selected. Furthermore, when the button 123 is operated in the state of the image P3, as shown in an image P4, the window R4 is displayed in bold, showing that the window R4 is selected. When the button 123 is operated in the state of the image P4, as shown in the image P1, the window R1 is displayed in bold, showing that the window R1 is selected.

When the button 124 is operated in the state of the image P1, as shown in the image P4, the window R4 is displayed in bold, showing that the window R4 is selected. Furthermore, when the button 124 is operated in the state of the image P4, as shown in the image P3, the window R3 is displayed in bold, showing that the window R3 is selected. When the button 124 is operated in the state of the image P3, as shown in the image P2, the window R2 is displayed in bold, showing that the window R2 is selected. When the button 124 is operated in the state of the image P2, as shown in the image P1, the window R1 is displayed in bold, showing that the window R1 is selected.

When the button 122 is operated in the state of the image P1, the image P1 is processed and zoomed in on the basis of the setting information relating to the window R1, and an image P5 is displayed.

When the zoom ring 125 and the zoom position stick 126 are operated in the state of the image P1 to operate the setting information relating to the window R1, as shown in an image P6, the window R1 is changed to a window R1' in accordance with the operation, and the window R1' is displayed.

When the button 122 is displayed in the state of the image P6 while the window R1' is being selected, the setting information relating to the window R1' is confirmed, the image P1 is processed on the basis of the setting information relating to the window R1', and an image P7 is displayed.

With the above-described operation, the user can view and recognize the zoom position and zoom magnification of a process to be applied to the image. Since the user can easily confirm whether the result of editing is a desired image, the user can easily implement the desired editing.

With the flowchart shown in FIG. 11, an image processing process performed by the image processing apparatus 13 shown in FIG. 4 will be described. In the following description, it is assumed that the storage block 43 is turned on by operating the button 121 of the remote controller 14.

In step S1, the delay unit 48 determines whether a new image is supplied from the image playback unit 12. This determination is repeated until a new image is supplied.

For example, when the image playback unit 12 reads an image recorded in the recording medium 11 and when the delay unit 48 determines that a new image is supplied from the image playback unit 12, in step S2, the delay unit 48 stores the supplied image to temporarily delay the image by one frame. In the following description, it is assumed that the image is processed in units of frames. Needless to say, however, the image is not limited to being processed in units of frames. Alternatively, for example, the image may be processed in units of fields.

In step S3, the feature value extractor 41 executes a feature-value extracting process and extracts a feature value of the image within one frame supplied from the image playback unit 12. That is, when the delay unit 48 temporarily stores the new image to delay the new image by one frame, the same image within that frame is also supplied to the feature value extractor 41. Therefore, the same image is temporarily stored to be delayed, and, at the same time, the feature value of the same image is extracted.

Figure 12:
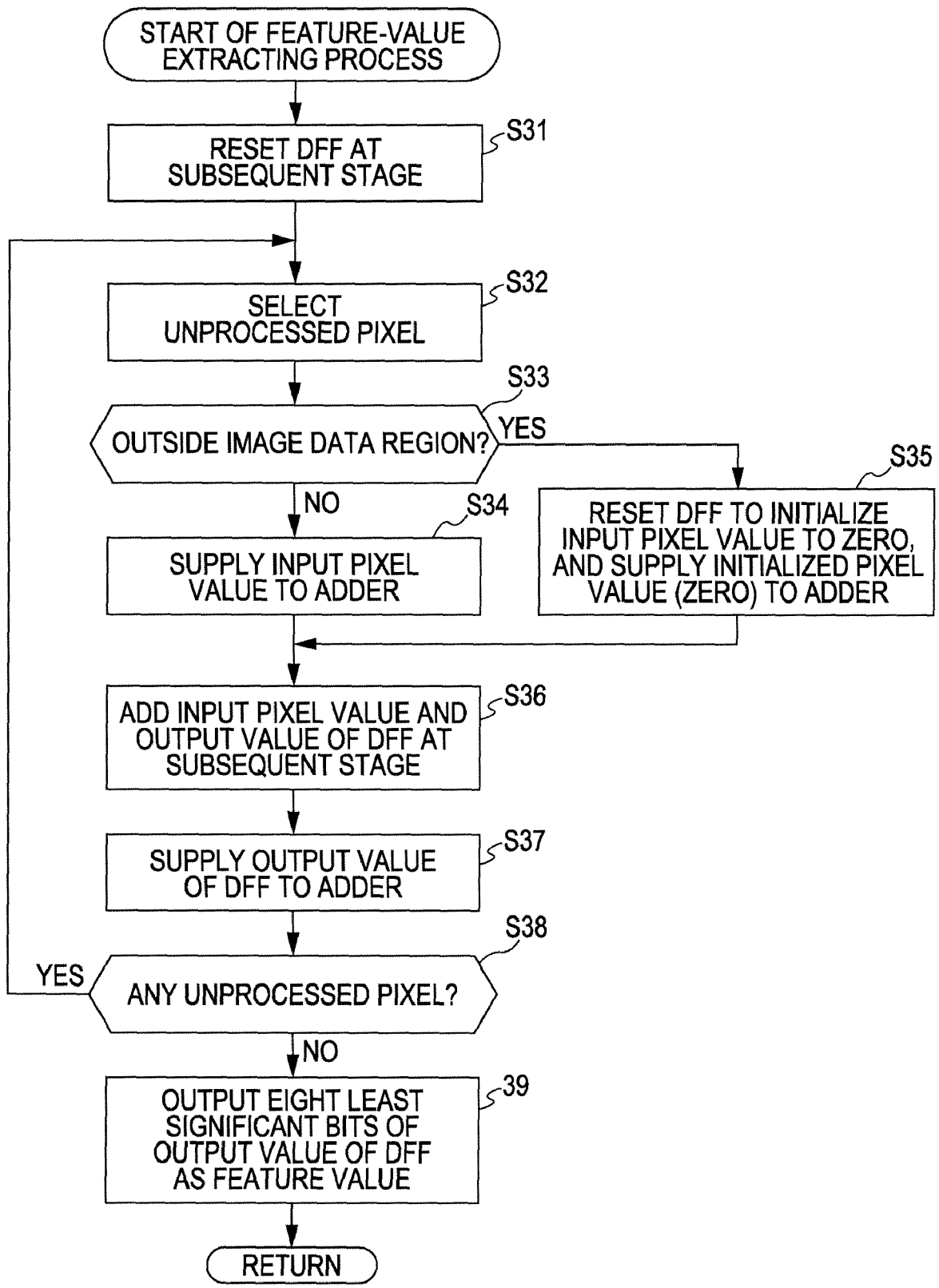
FIG. 12 is a flowchart of a feature-value extracting process shown in FIG. 11.

With reference to the flowchart shown in FIG. 12, the feature-value extracting process will be described.

In step S31, the DFF 83 is reset due to the frame start point S (FIG. 6).

In step S32, an unprocessed pixel is selected. In step S33, it is determined whether the pixel is outside the image data region. More specifically, for example, unprocessed pixels of the image within one frame are sequentially read in, for example, a raster scanning order, and it is determined whether each of the unprocessed pixels is outside the image data region.

As shown in FIG. 6, since the first pixel (pixel at the frame start point S) is included in synchronization data, the first pixel is outside the image data region. In step S35, the DFF 81 is reset, and the DFF 81 outputs zero as a pixel value. In contrast, when a pixel to be processed is selected in the raster scanning order and is within the image data region, in step S34, the DFF 81 supplies the pixel value of that pixel to the adder 82 in accordance with a generation timing of a clock signal.

In step S36, the adder 82 adds the input pixel value and a signal supplied from the DFF 83 and supplies the sum to the DFF 83.

In step S37, the DFF 83 returns the eight least significant bits of the sum supplied from the adder 82 in accordance with a generation timing of a clock signal. Here, although the DFF 83 outputs the sum to the output unit 84, the output unit 84 does not output the sum.

In step S38, it is determined whether there is another unprocessed pixel. If there is another unprocessed pixel, the flow returns to step S32. That is, the process in steps S32 to S38 is repeated until all the pixels in one frame are processed. When it is determined that all the pixels in one frame are processed, in step S39, the output unit 84 outputs the sum supplied from the DFF 83, namely, the eight least significant bits of the accumulative sum of pixel values contained in the image data region, as a feature value of the image of the frame.

With the above-described operation, the eight least significant bits of the accumulative sum of all the pixel values in the image data region are extracted from the image signal of one frame as the feature value of that frame.

The description returns to the flowchart shown in FIG. 11.

In step S4, the operation information recognizer 45 determines whether the remote controller 14 is operated by the user to specify a process to be applied to the image. For example, when the user specifies double zooming (2× zoom) looking at the image displayed on the display unit 15, the light receiver 44 receives a light emitting pattern of the remote controller 14. When a signal based on the light emitting pattern received by the light receiver 44 is supplied to the operation information recognizer 45, the operation information recognizer 45 determines that a user operation has been performed, and the flow proceeds to step S5.

In step S5, the operation information recognizer 45 recognizes operation information on the basis of the signal supplied from the light receiver 44 and supplies the operation information as the recognition result to the setting-information determining unit 46. On the basis of the operation information, the setting-information determining unit 46 determines, for the reflecting unit 49, setting information for applying a process to the image and supplies the setting information to the feature-value setting-information recorder 61 and the selector 47. That is, in this case, since it has been instructed to apply double zooming (2× zoom) to the image, setting information for specifying double zooming (2× zoom) is determined for the reflecting unit 49, and the setting information is supplied to the feature-value setting-information recorder 61 and the selector 47.

Figure 13:
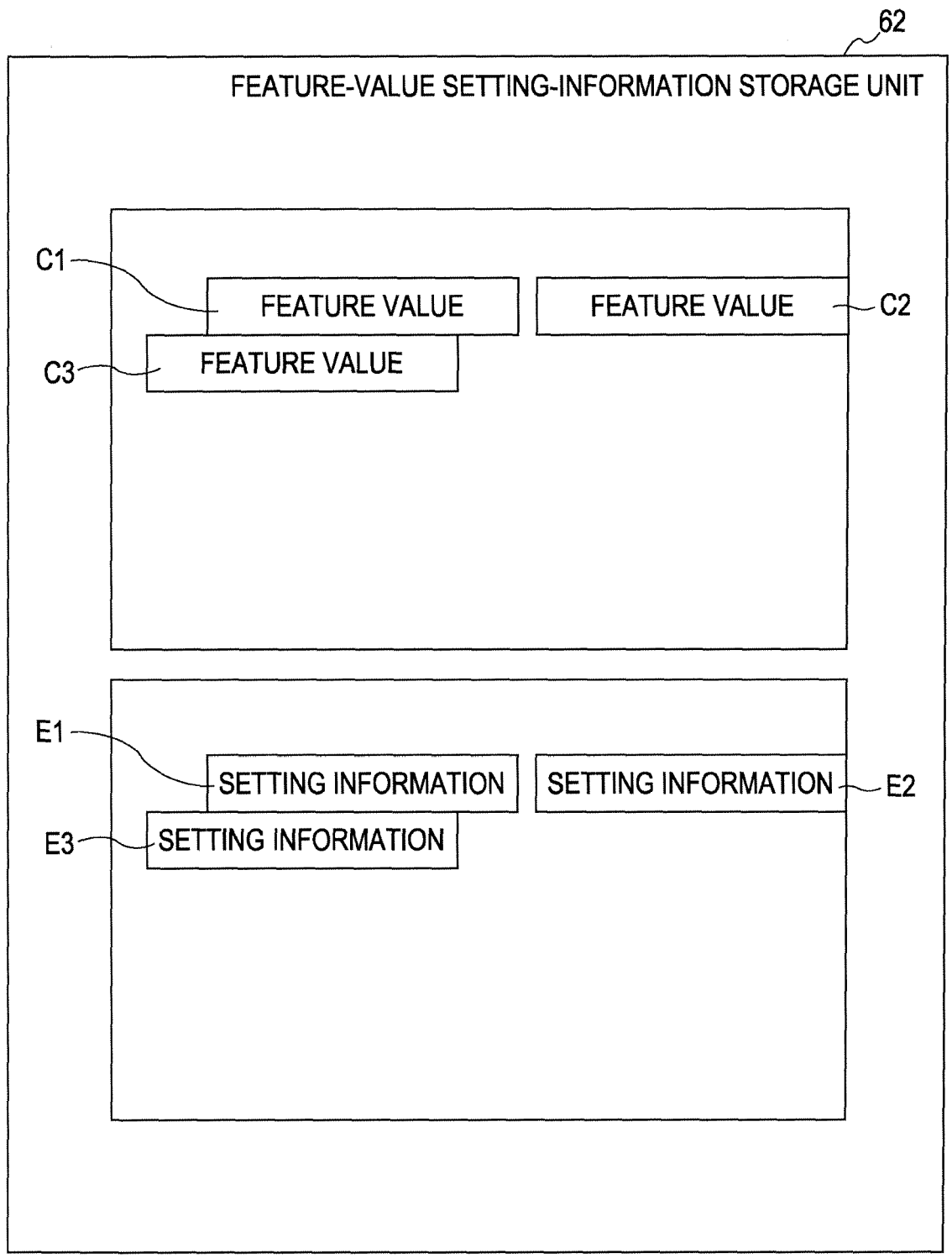
FIG. 13 is a diagram of the feature-value extracting process shown in FIG. 12.

In step S6, the feature-value setting-information recorder 61 records the feature value supplied from the feature value extractor 41 in the feature-value setting-information storage unit 62, and, at the same time, records the setting information supplied from the setting-information determining unit 46 in association with the feature value in the feature-value setting-information storage unit 62. In this manner, the feature value and the setting information are stored. More specifically, as shown in FIG. 13, when a feature value C1 is recorded at a predetermined address A, setting information E1 associated with the feature value C1 is recorded at an address m times larger than the address A, i.e., an address m×A. FIG. 13 shows the allocation of addresses at which feature values and setting information are stored in the feature-value setting-information storage unit 62.

Thereafter, the feature-value setting-information recorder 61 similarly records a feature value C2 at an address B and setting information E2 associated with the feature value C2 at an address m×B, and records a feature value C3 at an address C and setting information E3 associated with the feature value C3 at an address m×C. In this manner, the setting information is stored in association with the feature value. Once the feature value is determined, the address of the setting information can be specified from the address of the feature value. Therefore, a setting information search can be smoothly conducted for each feature value in the feature-value setting-information storage unit 62. The feature values and setting information are continuously recorded for a period during which the same process is continuously specified. That is, the feature values C1 to C3 shown in FIG. 13 are not limited to those within one frame. Feature values within frames during which the same process is continuously specified are continuously recorded. The same applies to the setting information. For example, the setting information E1 to E3 shown in FIG. 13 is not limited to that within one frame on the basis of the addresses associated with the feature values C1 to C3. Pieces of setting information within frames during which the same process is continuously specified are continuously recorded.

In step S7, the synchronization detector 42 executes a synchronization detecting process and detects synchronization of a feature value of the image being played back with a feature value to which setting information for applying a process to the image is associated.

Figure 14:
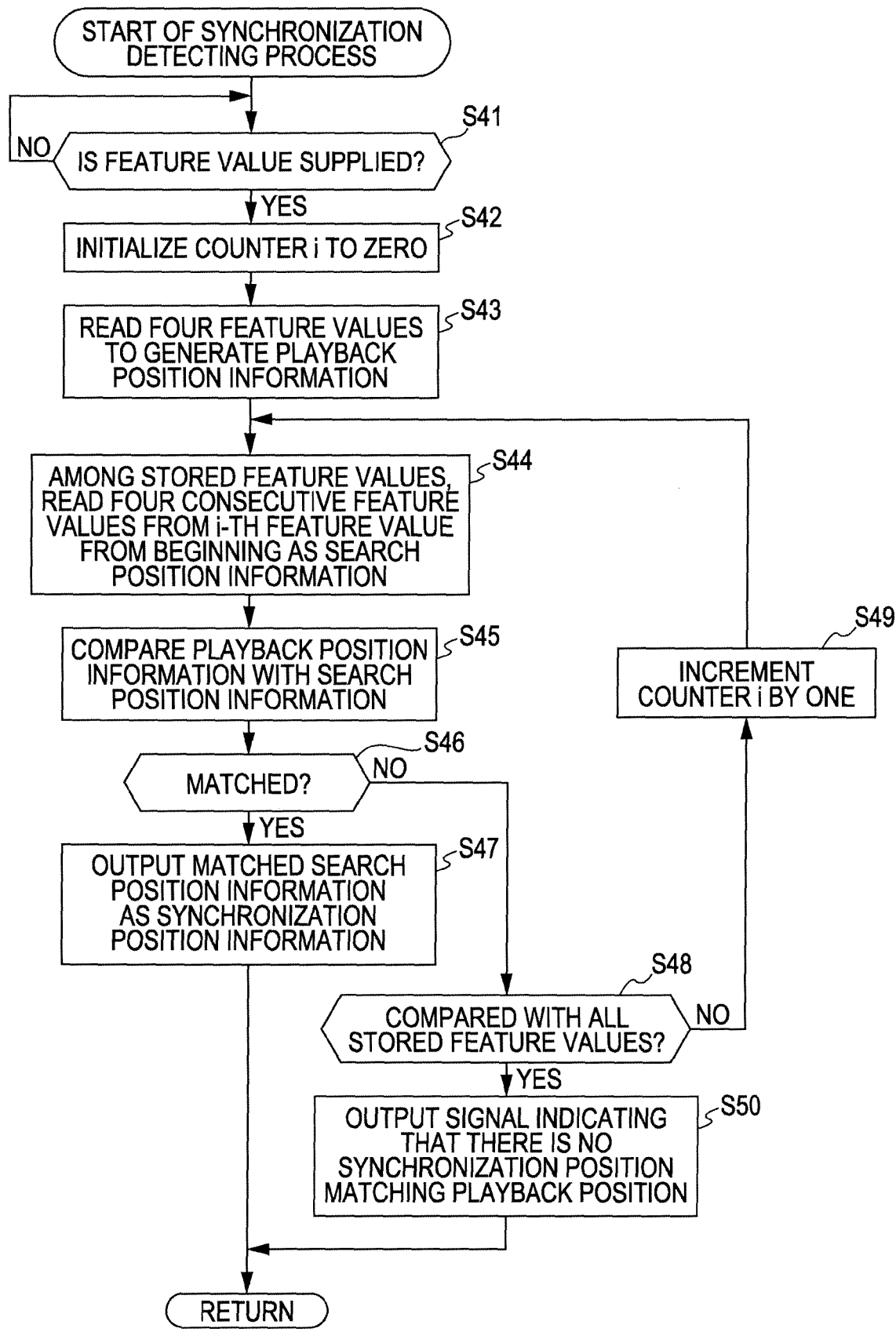
FIG. 14 is a flowchart of a synchronization detecting process shown in FIG. 11.

With reference to the flowchart shown in FIG. 14, the synchronization detecting process will be described.

In step S41, the playback-position feature-value generator 102 in the synchronization detector 42 determines whether a feature value is supplied from the feature value extractor 41. The determination is repeated until a feature value is supplied. For example, when a feature value is extracted by the feature-value extracting process performed in step S3 and the feature value of the image being played back is supplied from the feature value extractor 41, the flow proceeds to step S42.

In step S42, the search-position feature-value reader 104 initializes a counter i for counting search-position feature values.

In step S43, the playback-position feature-value generator 102 obtains the supplied feature value and the feature values stored in the feature value buffers 101-1 to 101-3. That is, when a new feature value is supplied to the feature value buffer 101-1, the feature value buffer 101-1 supplies the stored feature value to the playback-position feature-value generator 102 and the feature value buffer 101-2. Similarly, the feature value buffer 101-2 stores the supplied feature value and supplies the previously-stored feature value to the playback-position feature-value generator 102 and the feature value buffer 101-3. Furthermore, the feature value buffer 101-3 stores the feature value supplied from the feature value buffer 101-2 and supplies the previously-stored feature value to the playback-position feature-value generator 102. As a result, the feature value of the most recent frame and the feature values of the last three frames stored in the feature value buffers 101-1 to 101-3 are supplied to the playback-position feature-value generator 102. The playback-position feature-value generator 102 supplies the feature values of the four frames including the frame being played back as playback-position feature values to the comparator 103.

In step S44, the search-position feature-value reader 104 reads feature values of four consecutive frames starting from the i-th frame from the beginning of the feature values stored in the feature-value setting-information storage unit 62 as search-position feature values and supplies the search-position feature values to the comparator 103 and the detector 105.

In step S45, the comparator 103 compares the playback-position feature values, which are supplied from the playback-position feature-value generator 102 and which include a total of four feature values of the frame being played back and the last three frames, with the search-position feature values, which are supplied from the search-position feature-value reader 104 and which include the feature values of the four consecutive frames starting from the i-th frame from the beginning of the feature values stored in the feature-value setting-information storage unit 62.

In step S46, the comparator 103 determines on the basis of the comparison result whether the playback-position feature values match the search-position feature values. For example, when it is determined in step S46 that no matching is detected, in step S48, the search-position feature-value reader 104 determines whether the playback-position feature values have been compared with all the feature values stored in the feature-value setting-information storage unit 62. For example, when it is determined in step S48 that the playback-position feature values have not been compared with all the feature values in the feature-value setting-information storage unit 62, in step S49, the search-position feature-value reader 104 increments the counter i by one, and the flow returns to step S44. That is, with this operation, the process in steps S44 to S46, S48, and S49 is repeated when the playback-position feature values do not match the search-position feature values and until the playback-position feature values are compared with all the stored feature values. With shifts of one frame, the search-position feature values, which are the feature values of four consecutive frames, are compared with the playback-position feature values.

Figure 15:
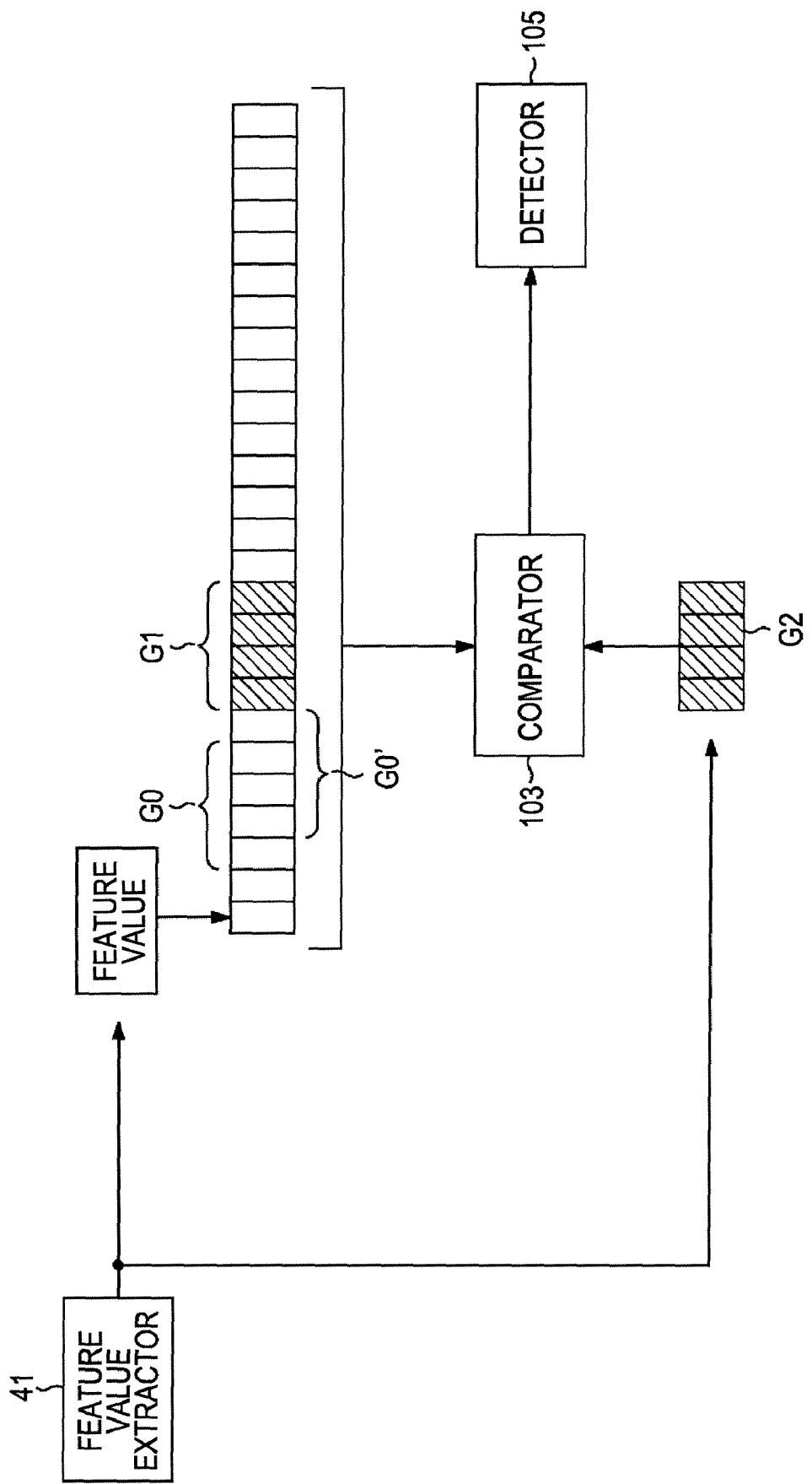
FIG. 15 is a diagram of the synchronization detecting process shown in FIG. 14.

That is, as shown in the upper right portion of FIG. 15, the search-position feature values are, in this state, a bulk of four consecutive feature values from among the feature values sequentially stored by the feature value extractor 41. In FIG. 15, the vertically long rectangle shape represents a feature value of one frame. Shaded portions G1 and G2 indicate that the same consecutive feature values are allocated. As shown in the lower right portion of FIG. 15, the playback-position feature values are a bulk of feature values of four consecutive frames including a feature value of a frame being played back, which are supplied from the feature value extractor 41.

For example, as shown in FIG. 15, when the playback-position feature values G2 are compared with search-position feature values G0, the playback-position feature values G2 do not match the search-position feature values G0, and hence no synchronization position is detected. Since not all the stored feature values are compared with the playback-position feature values G2, the counter i is incremented by one, and the playback-position feature values G2 are compared with search-position feature values G0'. In this manner, the search-position feature values are repeatedly compared with the playback-position feature values G2 with shifts of one frame to the right.

In step S46, for example, when the playback-position feature values G2 are compared with the search-position feature values G1, the search-position feature values G1 and the playback-position feature values G2 are the same in structure, and it is thus regarded that the search-position feature values G1 match the playback-position feature values G2. In step S47, the comparator 103 informs the detector 105 that the search-position feature values G1 match the playback-position feature values G2. On the basis of this information, the detector 105 supplies the beginning of the search-position feature values currently supplied from the search-position feature-value reader 104, that is, the i-th feature value from the beginning, as synchronization position information to the feature-value setting-information reader 63.

In contrast, when it is determined in step S48 that comparisons have been conducted with all the stored search-position feature values, in step S50, the detector 105 outputs information indicating that there is no search-position feature values matching the playback-position feature values and hence there is no synchronization.

With the above-described operation, the feature value of the image being played back can be synchronized with the feature value stored in the feature-value setting-information storage unit 62. In other words, to reduce the possibility of detecting synchronization at a wrong place due to accidental matching of only the feature value of the frame being played back with one of the feature values stored in the feature-value setting-information storage unit 62, not only the feature value of the frame being played back, but also the feature values of four frames including the frame being played back and the last three frames are compared with the feature values stored in the feature-value setting-information storage unit 62. Accordingly, synchronization detection can be performed more accurately. Since the feature values are used in this manner, the feature values can be set instead of time codes in units of frames. Without using time codes, synchronization can be detected in units of frames.

The description returns to the flowchart shown in FIG. 11.

In step S8, the feature-value setting-information reader 63 reads all pieces of corresponding setting information stored in the feature-value setting-information storage unit 62 on the basis of the synchronization position information.

In step S9, the selector 47 supplies the setting information supplied from the feature-value setting-information reader 63 to the display image generator 50. More specifically, since the setting information includes no information indicating that it has been confirmed, namely, no information indicating that it is not being edited, and since the operation information recognizer 45 supplies no information for confirming one of the pieces of setting information, the selector 47 supplies the setting information supplied from the feature-value setting-information storage unit 62 not to the reflecting unit 49, but to the display image generator 50.

In step S10, the display image generator 50 generates an image indicating a process on the basis of the setting information supplied from the selector 47. That is, for example, when four pieces of setting information are supplied, as in the image P1 shown in FIG. 10, the display image generator 50 generates the windows R1 to R4.

In step S11, since no setting information is supplied from the selector 47 to the reflecting unit 49, the reflecting unit 49 supplies the image stored in the delay unit 48 to the display image generator 50 without changing the image.

In step S12, the display image generator 50 combines the window(s) generated in step S9 with the image supplied from the reflecting unit 49 to generate a display image in the OSD format and displays the image on the display unit 15. That is, for example, when the image P1 shown in FIG. 10, namely, a star image stored in the delay unit 48, is supplied, the windows R1 to R4 are combined with the image P1 to generate a display image in the OSD format, and the image in the OSD format is displayed on the display unit 15.

In step S13, it is determined whether an instruction to end the image processing process is given. If such an instruction is given, the process ends. In contrast, if no such instruction is given, the flow returns to step S1.

In contrast, when it is determined in step S4 that a user operation has been performed, the flow proceeds to step S14. The synchronization detector 42 executes a synchronization detecting process and supplies synchronization position information to the feature-value setting-information reader 63. Since the synchronization detecting process is the same as that described with reference to the flowchart shown in FIG. 14, a repeated description thereof is omitted.

In step S15, the feature-value setting-information reader 63 determines whether the feature value that matches the playback-position feature value of the frame being played back is stored in the feature-value setting-information storage unit 62. For example, when the synchronization position information is supplied in step S47 of the flowchart shown in FIG. 14, the feature value that matches the playback-position feature value of the frame being played back is stored in the feature-value setting-information storage unit 62. Thus, the flow proceeds to step S16.

In step S16, the feature-value setting-information reader 63 determines whether the setting information associated with the synchronized feature value is stored in the feature-value setting-information storage unit 62. That is, a feature value may be stored in the feature-value setting-information storage unit 62 without being associated with setting information. Therefore, the presence of the setting information associated with the feature value is determined in step S11.

When it is determined in step S16 that, for example, no setting information associated with the feature value is stored, in step S17, the feature-value setting-information reader 63 supplies no setting information to the selector 47. With this operation, no setting information is supplied from the setting-information determining unit 46 or the feature-value setting-information reader 63 to the selector 47, and hence no setting information specifying a process is supplied to the reflecting unit 49. As a result, the reflecting unit 49 displays the image of the frame, which is temporarily stored in the delay unit 48, on the display unit 15 without changing the image. The selector 47 supplies no setting information to the display image generator 50.

As a result, in step S18, the image of the frame, which has been temporarily stored in the delay unit 48, is supplied from the reflecting unit 49 to the display image generator 50 without being changed. Since no window is generated, the image of the frame, which has been temporarily stored in the delay unit 48, is displayed on the display unit 15 without being changed.

In contrast, when it is determined in step S16 that, for example, the setting information associated with the feature value is stored, in step S19, the feature-value setting-information reader 63 reads the setting information stored in association with the feature value of the synchronization position information and supplies the setting information to the selector 47.

In step S20, the selector 47 determines whether the setting information is being edited, that is, whether the setting information is being confirmed. More specifically, the selector 47 determines whether the setting information includes information indicating that it has been confirmed, namely, information indicating that it is not being edited. When it is determined in step S20 that the setting information includes information indicating that it has been confirmed, that is, when it is determined that the setting information is not being edited, the flow proceeds to step S21.

In step S21, the selector 47 supplies the confirmed setting information, which is supplied from the feature-value setting-information reader 63, to the reflecting unit 49.

In step S22, the reflecting unit 49 applies a process to the image stored in the delay unit 48 on the basis of the setting information supplied from the selector 47 to reflect in the image the process in accordance with the details of the user's instruction and supplies the processed image to the display image generator 50.

In step S23, since no setting information is supplied from the selector 47 to the display image generator 50, the display image generator 50 displays the image supplied from the reflecting unit 49 on the display unit 15 without changing the image.

That is, in the case of the confirmed setting information, the reflecting unit 49 applies a process based on the setting information to the image delayed by the delay unit 48 and displays the processed image on the display unit 15.

When it is determined in step S20 that the setting information is being edited, that is, the setting information includes no information indicating that it has been confirmed, in step S24, the selector 47 determines whether operation information for confirming one of the pieces of setting information is supplied from the operation information recognizer 45. If no such operation information is supplied, the flow proceeds to step S9. That is, an image in the OSD format is to be displayed.

In contrast, when it has been determined in step S24 that operation information for confirming one of the pieces of setting information is supplied, in step S25, on the basis of the confirmed setting information, the setting-information determining unit 46 instructs the feature-value setting-information recorder 61 to delete all the pieces of setting information except the confirmed setting information. Among the pieces of setting information stored in the feature-value setting-information storage unit 62 in association with the feature value at that time, the feature-value setting-information recorder 61 keeps the confirmed setting information and deletes all the other pieces of setting information. The flow proceeds to step S21.

Figure 16:
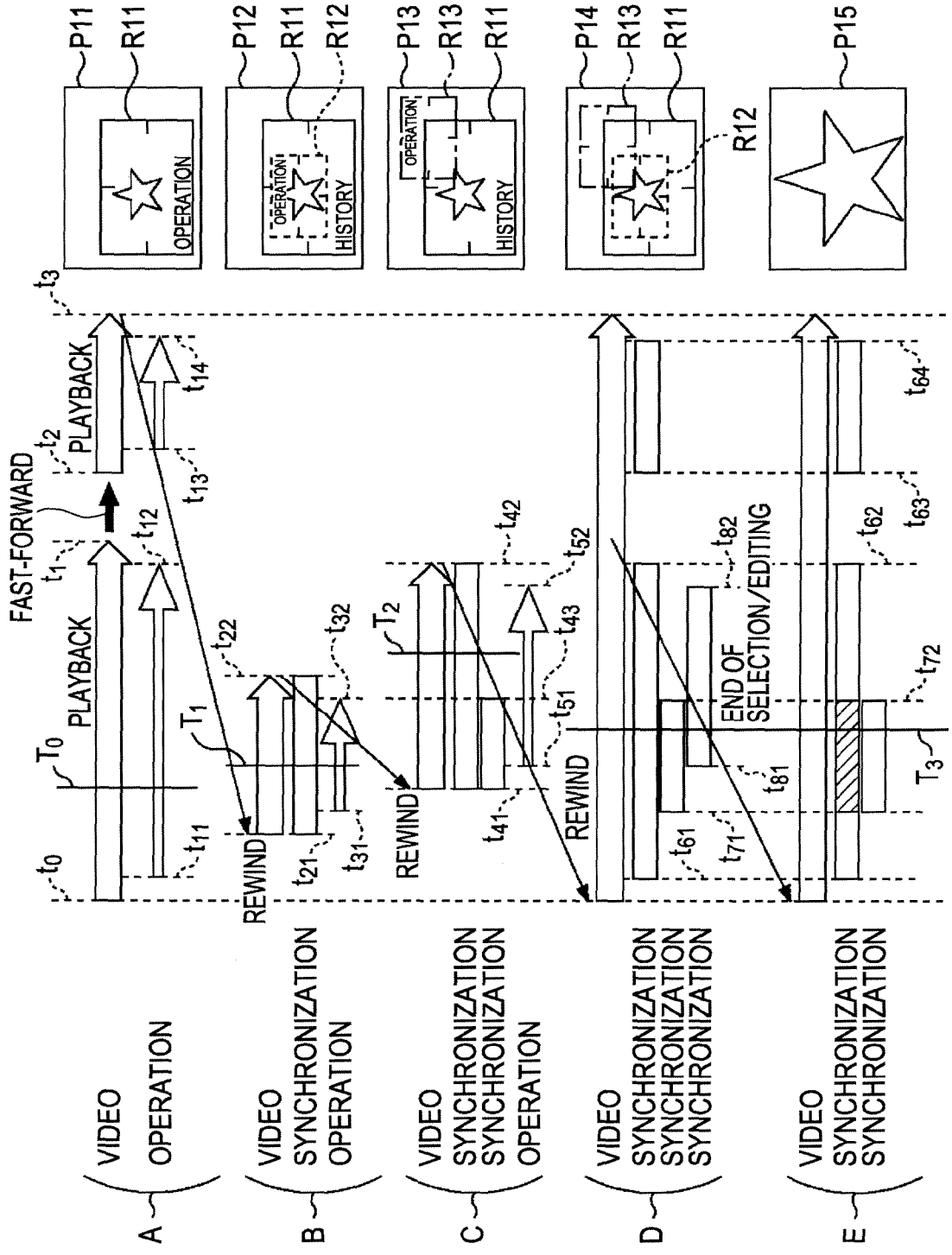
FIG. 16 is a chart describing the image processing operation performed by the image processing apparatus shown in FIG. 4.

With the above-described operation, the operation shown in FIG. 16 is implemented.

That is, when a video image sequence recorded in the recording medium 11 is played back from time t0 to time t1 in the initial state or state A shown in FIG. 16, the remote controller 14 is operated from time t11 to time t12 and the process from steps S1 to S13 is repeated to specify a zoom operation. At time T0 during the operation, as shown in an image P11 on the right side in the state A shown in FIG. 16, a display image in the OSD format including a window R11 (solid line) associated with setting information indicating the zoom operation specified from time t11 to time t12 overlapping an input image is generated, and the image is displayed on the display unit 15.

Thereafter, the video sequence is fast-forwarded from time t1 to time t2. During playback from time t2 to time t3, the remote controller 14 is operated from time t13 to time t14.

Thereafter, the video sequence is instructed at time t3 to be rewound until time t21. In a state B shown in FIG. 16, playback is done from time t21 to time t22. Since the setting information specified by the remote controller 14 in the state A is read in synchronization from time t11 to time t12, at time T1, as shown in an image P12 on the right side of FIG. 16, the window R11 is displayed. From time t31 to time t32, the remote controller 14 is operated and the process from steps S1 to S13 is repeated to specify a zoom operation. Since setting information is stored, a window R12 (dotted line) is displayed.

Thereafter, the video sequence is instructed at time t22 to be rewound until time t41. In a state C shown in FIG. 16, playback is done from time t41 to time t42. From time t51 to time t52, the setting information specified by the remote controller 14 is read in synchronization. Since the window R12 is displayed from time t41 to time t43, the window R12 is not displayed at time T2. As shown in an image P13 on the right side of FIG. 16, the window R11 is displayed. From time t51 to time t52, the remote controller 14 is operated, and the process in steps S1 to S13 is repeated to specify a zoom operation. Since setting information is stored, a window R13 (dotted-chain line) is displayed.

Thereafter, the video sequence is rewound from time t42 until time t1. In a state D shown in FIG. 16, when the entire video sequence is played back from time t1 to time t3, the process in steps S1 to S4, S14 to S16, S19, S20, S24, and S9 to S13 is repeated provided that the remote controller 14 is not operated at all. From time t61 to time t62, the setting information specified by the remote controller 14 is read in synchronization from time t21 to time t22 in the state B. At time T3, as shown in an image P14 on the right side of FIG. 16, the window R11 (solid line) is displayed. From time t71 to time t72, the setting information specified by the remote controller 14 is read in synchronization from time t31 to time t32 in the state B. At time T3, as shown in the image P14 on the right side of FIG. 16, the window R12 (dotted line) is displayed. From time t81 to time t82, since the setting information specified by the remote controller 14 is read in synchronization from time t41 to time t42 in the state C, at time T3, as shown in the image P14 on the right side of FIG. 16, the window R13 (dotted-chain line) is displayed. From time t63 to time t64, the setting information specified by the remote controller 14 is read in synchronization from time t13 to time t14 in the state A. Since the period from time t63 to time t64 does not include time T3, no corresponding window is displayed on the image P14 on the right side of FIG. 16.

After the state D, the remote controller 14 is operated to select the window R12 by way of example, and the process from steps S1 to S4, S14 to S16, S19, S20, S24, S25, S22, and S23 is repeated. In a state E shown in FIG. 16, the video sequence is rewound until time t1, and the entire video sequence is played back from time t1 to time t3. Thereafter, from time t61 to time t71, the setting information specified by the remote controller 14 is read in synchronization from time t11 to time t12 in the state A. From time t71 to time t72, instead of the setting information (shaded portion in FIG. 16) specified from time t11 to time t12 in the state A, the setting information specified by the remote controller 14 from time t31 to time t32 in the state B is read in synchronization. From time t72 to time t62, the setting information specified by the remote controller 14 is read in synchronization from time t11 to time t12 in the state A.

Therefore, at time T3, as shown in an image P15 on the right side of FIG. 16 in the state E, an image generated by zooming in the window R12 is displayed on the display unit 15.

In the state A shown in FIG. 16, the top row shows the timing of the first playback of the video sequence, and the bottom row shows the operation timing of the remote controller 14. In the state B shown in FIG. 16, the top row shows the timing of the second playback of the video sequence; the second row from the top shows the timing of reflecting in synchronization the setting information set on the basis of the operation of the remote controller 14 in the state A; and the bottom row shows the operation timing of the remote controller 14. In the state C shown in FIG. 16, the top row shows the timing of the third playback of the video sequence; the second row from the top shows the timing of reflecting in synchronization the setting information set on the basis of the operation of the remote controller 14 in the state A; the third row from the top shows the timing of reflecting in synchronization the setting information set on the basis of the operation of the remote controller 14 in the state B; and the bottom row shows the operation timing of the remote controller 14. In the state D shown in FIG. 16, the top row shows the timing of the fourth playback of the video sequence; the second row from the top shows the timing of reflecting in synchronization the setting information set on the basis of the operation of the remote controller 14 in the state A; the third row from the top shows the timing of reflecting in synchronization the setting information set on the basis of the operation of the remote controller 14 in the state B; and the bottom row shows the timing of reflecting in synchronization the setting information set on the basis of the operation of the remote controller 14 in the state C. The state E shown in FIG. 16 is subsequent to the confirmation made in the state D. That is, the top row shows the timing of the fifth playback of the video sequence; the second row from the top shows the timing of reflecting in synchronization the setting information set on the basis of the operation of the remote controller 14 in the state A; and the bottom row shows the timing of reflecting in synchronization the setting information set on the basis of the operation of the remote controller 14 in the state B.

Accordingly, a plurality of processes to be applied to an image can be displayed as windows in the same image so that the user can view and recognize these processes at the same time. Since the user can visually and easily compare these processes, the user can edit the image as desired.

In the above description, a feature value is the integrated value of pixel values in the image data region of an image signal within one frame. However, other types of feature values may be used. For example, a feature value may be a motion vector (full-screen motion and local motion), a value indicating the frequency of appearance of a specific waveform pattern, the integrated value of pixel values in a reduced image, the integrated value of pixel values in a specific part of the image, these values obtained using a plurality of frames, or a combination of these plural feature values.

Although the setting information has been described in terms of zoom magnification, the setting information may be of other types of information. For example, the setting information may be the zoom position (center position), zoom parameters including a combination of the zoom position and zoom magnification, image quality setting parameters such as brightness, contrast, gamma correction, and digital reality creation (DRC) palette values (resolution and noise settings), or audio parameters such as volume or voice switching (switching of the language being used).

In the above description, setting information indicating the zoom position and zoom magnification is displayed as a window by way of example. Since the setting information may be displayed in any form as long as it is visually displayed in an image, other processes to be applied to the image may be displayed as objects indicating the details of the processes in the image.

As has been described above, according to the image processing apparatus and method and the program therefor of the embodiments of the present invention, a feature value is extracted from an image; setting information for applying a process to the image is set; the setting information is recorded in association with the feature value of the image in a data recording medium; the feature value in the data recording medium is synchronized with the extracted feature value; when the feature value in the data recording medium is synchronized with the extracted feature value, setting information recorded in association with the synchronized feature value is read from the data recording medium; the process to be applied to the image is reflected on the basis of the read setting information; a display image is generated by combining an object indicating the read setting information with the image in which the process applied to the image is reflected; and the read setting information is selectively supplied so as to be usable in reflecting the process applied to the image or in generating the display image.

As a result, every time an image is played back, a predetermined process to be applied to the image to reproduce the processed image, without applying the process to the original image data, can be easily edited. In this way, the user can visually and easily recognize the editing of the predetermined process to be applied to the image to reproduce the image every time the image is played back without applying the process to the original image data, and, as a result, the process can be easily edited.

The series of processes described above can be performed using hardware or software. If software is used for this series of processes, a program constituting the software is installed from a recording medium on a computer installed in dedicated hardware or, for example, a general-purpose personal computer capable of performing various functions by installing various programs.

Figure 17:
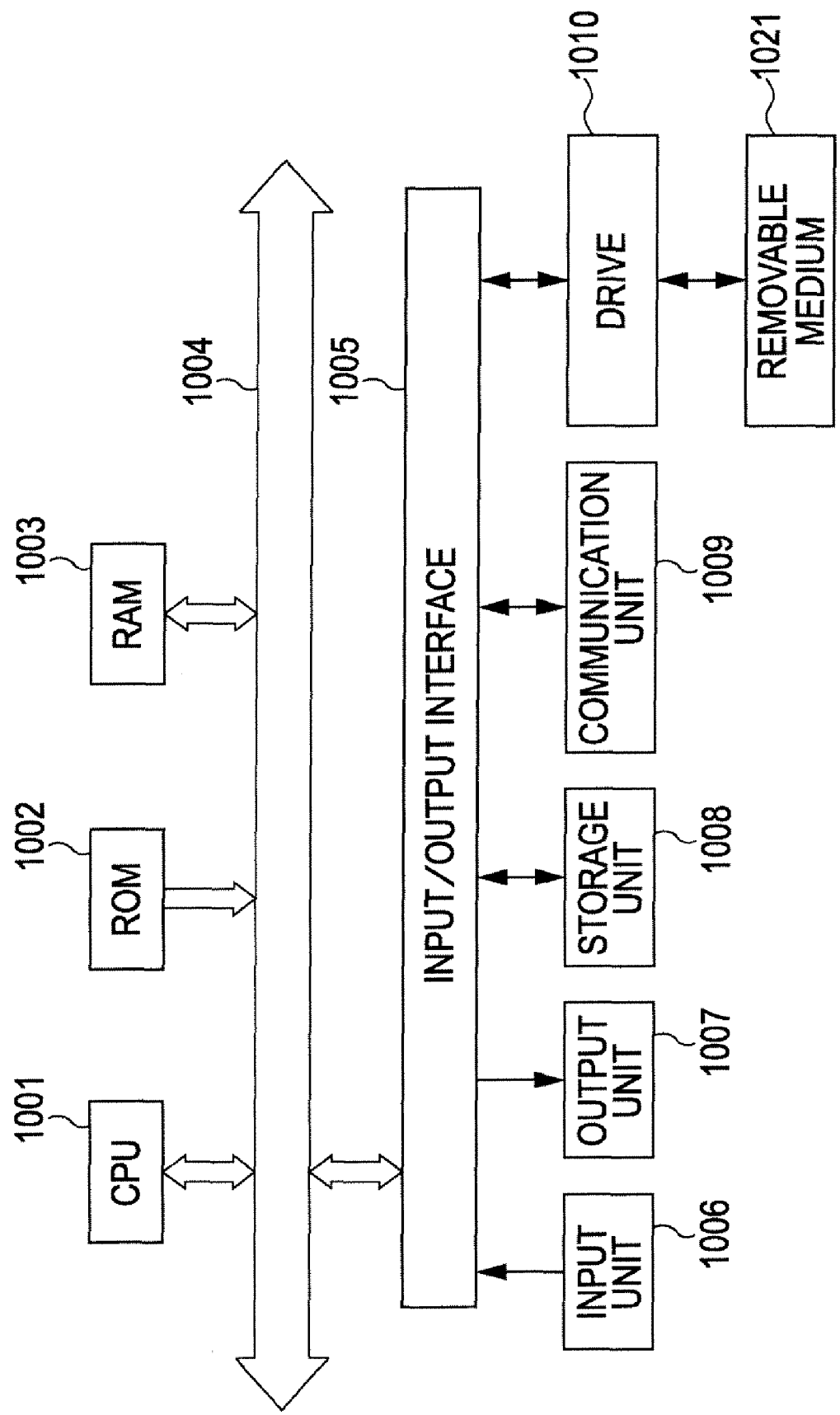
FIG. 17 is a diagram of a personal computer.

FIG. 17 shows an exemplary configuration of a personal computer in the case where the electrical internal structure of the image processing apparatus 13 shown in FIG. 4 is realized by software. A central processing unit (CPU) 1001 of the personal computer controls the overall operation of the personal computer. The CPU 1001 executes a program stored in a read only memory (ROM) 1002 when a user gives an instruction to the CPU 1001 using an input unit 1006 including a keyboard and a mouse via a bus 1004 and an input/output interface 1005. The CPU 1001 loads a program that is read from a removable disk 1021 including a magnetic disk, an optical disk, a magneto-optical disk, or a semiconductor memory connected to a drive 1010 and that is installed in a storage unit 1008 into a random access memory (RAM) 1003 and executes the program. As a result, the functions of the image processing apparatus 13 shown in FIG. 4 are realized by the software. Furthermore, the CPU 1001 controls a communication unit 1009 to communicate with the outside and to exchange data.

A recording medium having the program recorded therein not only includes, as shown in FIG. 17, the removable medium 1021, which is a package medium including a magnetic disk (including a flexible disk), an optical disk (including a compact disc-read only memory (CD-ROM) and a digital versatile disc (DVD)), a magneto-optical disk (including a mini-disc (MD)), or a semiconductor memory, which records the program and is distributed in order to provide the program to a user independent of the computer, but also includes the ROM 1002 and the hard disk included in the storage unit 1008 which record the program and which are built in the computer to be provided to the user.

In the specification, the steps forming the program recorded in the recording medium are not necessarily performed in accordance with the time sequence following the order described above. Alternatively, the steps may be performed in parallel or individually.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus comprising:
   feature-value extracting means for extracting a feature value from an image;
   setting means for setting setting information for applying a process to the image;
   recording means for recording the setting information in association with the feature value of the image in a data recording medium;
   synchronizing means for synchronizing the feature value in the data recording medium with the feature value extracted by the feature-value extracting means;
   reading means for reading, when the feature value in the data recording medium is synchronized by the synchronizing means with the feature value extracted by the feature-value extracting means, setting information recorded in association with the synchronized feature value from the data recording medium;
   reflecting means for reflecting the process applied to the image on the basis of the setting information read by the reading means;
   display-image generating means for generating a display image by combining an object indicating the setting information read by the reading means with the image in which the process applied to the image is reflected by the reflecting means; and
   selecting means for selectively supplying the setting information read by the reading means to the reflecting means or the display-image generating means.

2. The image processing apparatus according to claim 1, wherein the feature-value extracting means extracts a sum of pixel values of pixels within a predetermined region included in the image as the feature value.

3. The image processing apparatus according to claim 1, further comprising operation means for performing an operation specifying the process to be applied to the image,
   wherein the setting means sets the setting information for applying the process to the image on the basis of details of the operation of the operation means, and
   wherein the recording means records the details of the operation in association with the feature value of the image in the data recording medium.

4. The image processing apparatus according to claim 1, wherein the setting information includes information indicating whether the setting information itself is being edited.

5. The image processing apparatus according to claim 4, wherein, when the setting information includes the information indicating that the setting information itself is being edited, the reflecting means supplies the image to the display-image generating means without changing the image, and the display-image generating means generates the display image by combining the image supplied from the reflecting means with a window, serving as the object, indicating a range in which the process is applied on the basis of the setting information read by the reading means.

6. The image processing apparatus according to claim 4, wherein, when the setting information includes no information indicating that the setting information itself is being edited, the selecting means selectively supplies the setting information read by the reading means only to the reflecting means, the reflecting means reflects the process applied to the image on the basis of the setting information read by the reading means, and the display-image generating means regards the image in which the process applied to the image is reflected by the reflecting means as the display image.

7. The image processing apparatus according to claim 1, wherein the synchronizing means includes
   search-position feature-value extracting means for sequentially extracting, from the data recording medium in which the setting information for applying the process to the image is recorded in association with the feature value of the image, the feature value as a search-position feature value, and
   comparing means for sequentially comparing the feature value extracted by the feature-value extracting means with the search-position feature value,
   wherein, when a comparison result shows that the feature value extracted by the feature-value extracting means matches the search-position feature value, it is regarded that the feature value in the data recording medium in which the setting information for applying the process to the image is recorded in association with the feature value of the image is synchronized with the feature value extracted by the feature-value extracting means.

8. An image processing method comprising the steps of:
   extracting a feature value from an image;
   setting setting information for applying a process to the image;
   recording the setting information in association with the feature value of the image in a data recording medium;
   synchronizing the feature value in the data recording medium with the extracted feature value;
   reading, when the feature value in the data recording medium is synchronized with the extracted feature value, setting information recorded in association with the synchronized feature value from the data recording medium;
   reflecting the process applied to the image on the basis of the read setting information;
   generating a display image by combining an object indicating the read setting information with the image in which the process applied to the image is reflected; and
   selectively supplying the read setting information so as to be usable in reflecting the process applied to the image or in generating the display image.

9. A non-transitory computer-readable medium having a computer-readable program recorded therein, when executed by a processor the computer-readable program performs steps comprising:
   extracting a feature value from an image;
   setting setting information for applying a process to the image;
   recording the setting information in association with the feature value of the image in a data recording medium;
   synchronizing the feature value in the data recording medium with the extracted feature value;
   reading, when the feature value in the data recording medium is synchronized with the extracted feature value, setting information recorded in association with the synchronized feature value from the data recording medium;

reflecting the process applied to the image on the basis of the read setting information;

generating a display image by combining an object indicating the read setting information with the image in which the process applied to the image is reflected; and selectively supplying the read setting information so as to be usable in reflecting the process applied to the image or in generating the display image.

10. An image processing apparatus comprising:

a feature value extractor configured to extract a feature value from an image;

a setting unit configured to set setting information for applying a process to the image;

a recorder configured to record the setting information in association with the feature value of the image in a data recording medium;

a synchronizing unit configured to synchronize the feature value in the data recording medium with the feature value extracted by the feature value extractor;

a reader configured to read, when the feature value in the data recording medium is synchronized by the synchronizing unit with the feature value extracted by the feature value extractor, setting information recorded in association with the synchronized feature value from the data recording medium;

a reflecting unit configured to reflect the process applied to the image on the basis of the setting information read by the reader;

a display image generator configured to generate a display image by combining an object indicating the setting information read by the reader with the image in which the process applied to the image is reflected by the reflecting unit; and a selector configured to selectively supply the setting information read by the reader to the reflecting unit or the display image generator.

* * * * *